US009152180B2

(12) United States Patent
Kim

(10) Patent No.: US 9,152,180 B2
(45) Date of Patent: Oct. 6, 2015

(54) PORTABLE DEVICE AND CONTROL METHOD THEREOF

(71) Applicant: LG ELECTRONICS INC., Seoul (KR)

(72) Inventor: Jihwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 142 days.

(21) Appl. No.: 13/797,308

(22) Filed: Mar. 12, 2013

(65) Prior Publication Data

US 2014/0204037 A1 Jul. 24, 2014

(30) Foreign Application Priority Data

Jan. 24, 2013 (KR) .................. 10-2013-0008221

(51) Int. Cl.
*G06F 1/16* (2006.01)
*G06F 3/03* (2006.01)

(52) U.S. Cl.
CPC ............ *G06F 1/1647* (2013.01); *G06F 1/1652* (2013.01); *G06F 3/03* (2013.01); *G06F 2203/04102* (2013.01)

(58) Field of Classification Search
None
See application file for complete search history.

(56) References Cited

U.S. PATENT DOCUMENTS

| | | | | |
|---|---|---|---|---|
| 7,463,238 B2* | 12/2008 | Funkhouser et al. | ......... | 345/107 |
| 8,860,656 B1* | 10/2014 | Cho et al. | ...................... | 345/102 |
| 2002/0090980 A1* | 7/2002 | Wilcox et al. | ................. | 455/566 |
| 2003/0071800 A1* | 4/2003 | Vincent et al. | ................. | 345/204 |
| 2008/0151480 A1* | 6/2008 | Chung et al. | .................. | 361/681 |
| 2008/0303782 A1* | 12/2008 | Grant et al. | ................... | 345/156 |
| 2009/0051830 A1* | 2/2009 | Matsushita et al. | ........... | 348/836 |
| 2010/0033435 A1* | 2/2010 | Huitema | ........................ | 345/173 |
| 2010/0056223 A1 | 3/2010 | Choi et al. | | |
| 2010/0117975 A1* | 5/2010 | Cho | .............................. | 345/173 |
| 2010/0167791 A1* | 7/2010 | Lim | .............................. | 455/566 |
| 2011/0148797 A1 | 6/2011 | Huitema et al. | | |
| 2011/0176260 A1 | 7/2011 | Walters et al. | | |
| 2012/0019482 A1* | 1/2012 | Wang | ............................ | 345/175 |
| 2012/0212433 A1 | 8/2012 | Lee et al. | | |
| 2013/0127917 A1* | 5/2013 | Kwack et al. | ................. | 345/660 |
| 2013/0201208 A1* | 8/2013 | Cho et al. | ....................... | 345/619 |
| 2013/0234951 A1* | 9/2013 | Kim et al. | ...................... | 345/173 |
| 2014/0002430 A1* | 1/2014 | Kwack et al. | ................. | 345/207 |
| 2014/0015743 A1* | 1/2014 | Seo et al. | ....................... | 345/156 |

* cited by examiner

*Primary Examiner* — Dismery Mercedes
(74) *Attorney, Agent, or Firm* — Birch, Stewart Kolasch & Birch, LLP

(57) ABSTRACT

A portable device and a control method thereof are disclosed that enable a user to more conveniently and accurately control a flexible display. The portable device includes a main display, a flexible display, a measurement unit configured to measure a first length of the flexible display, the first length being a measurement of the flexible display that is extended from the housing unit, when the flexible display is extended from the housing unit, and a control unit configured to obtain a second length of the flexible display, compare the second length with the width of the main display, and to display an indicator configured to indicate the second length on the main display according to the comparison result. The second length is a measurement of the flexible display that is not extended from the housing unit using the first length when the flexible display is extended from the housing unit.

19 Claims, 20 Drawing Sheets

FIG. 8
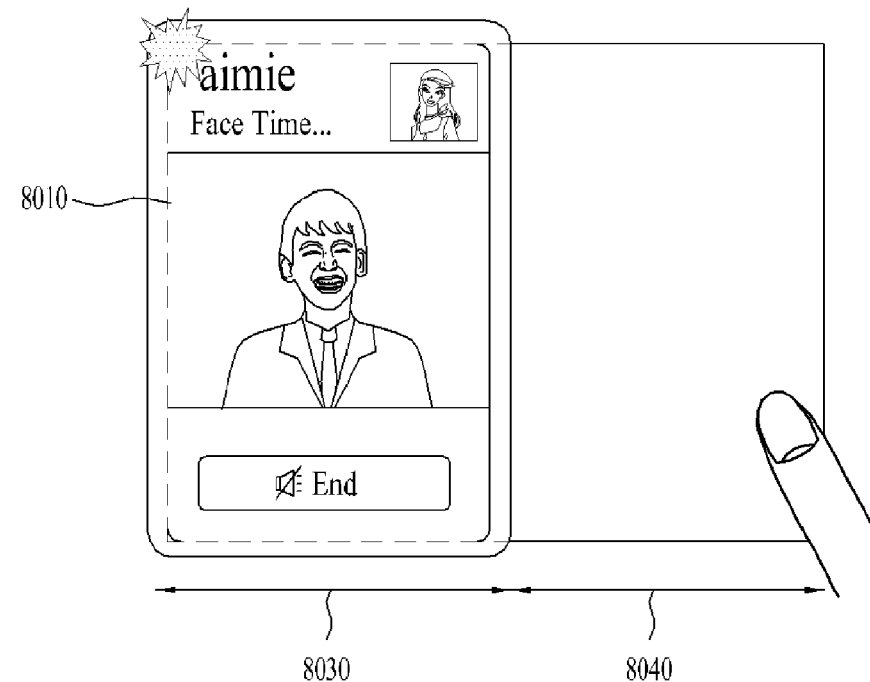
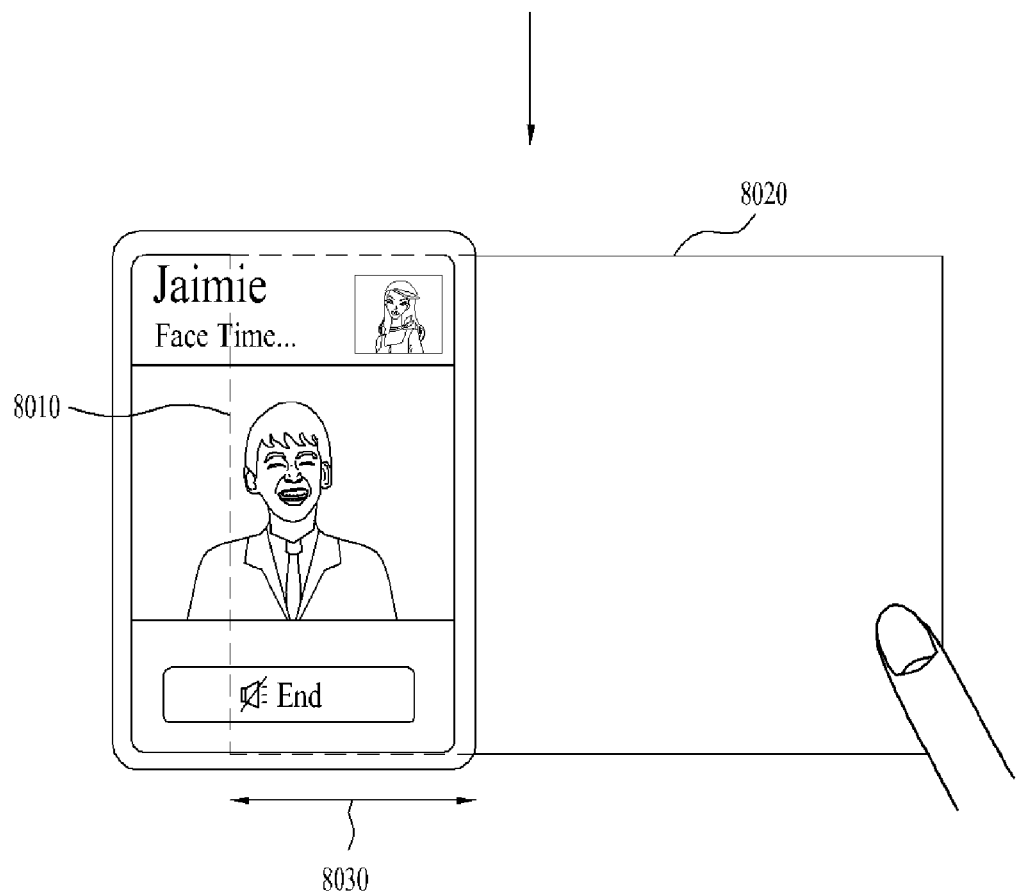

FIG. 11B
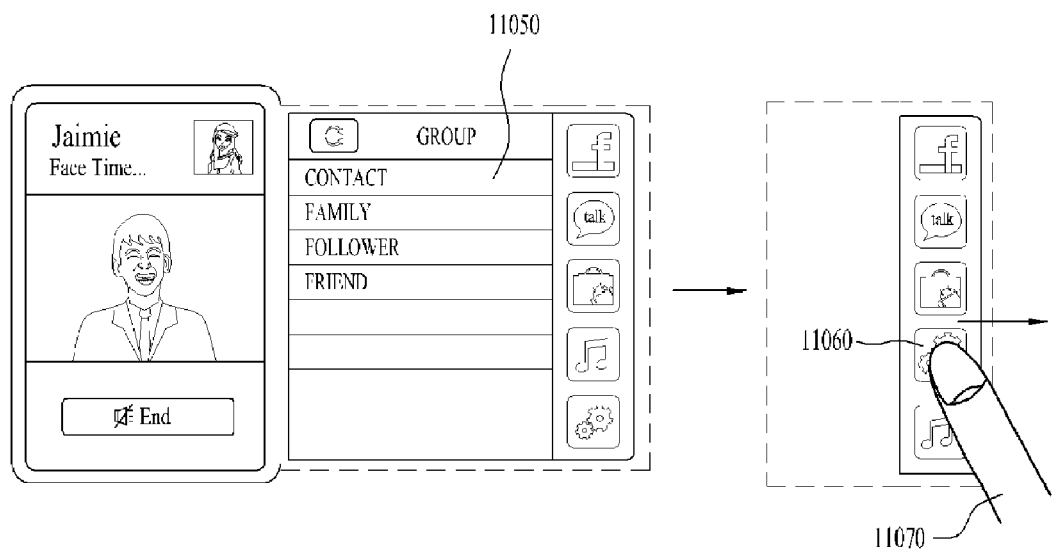
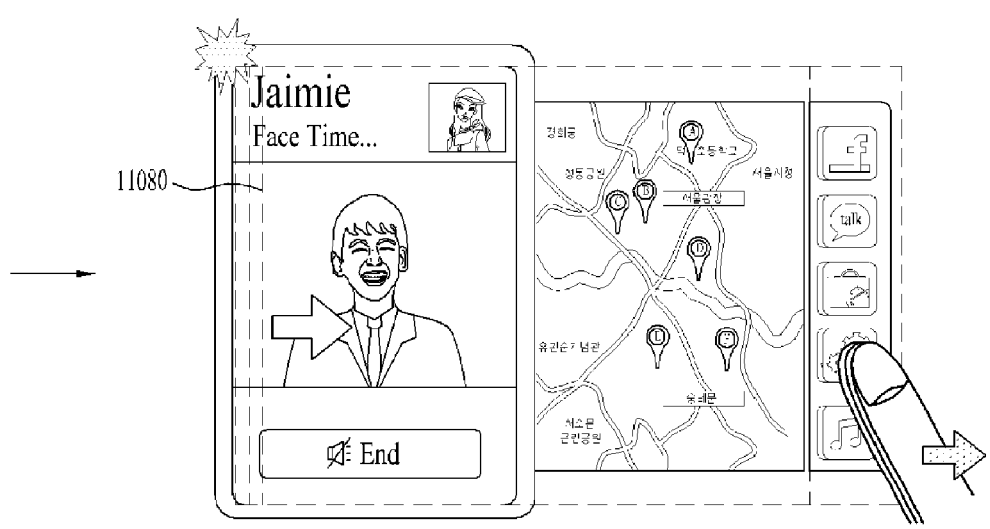

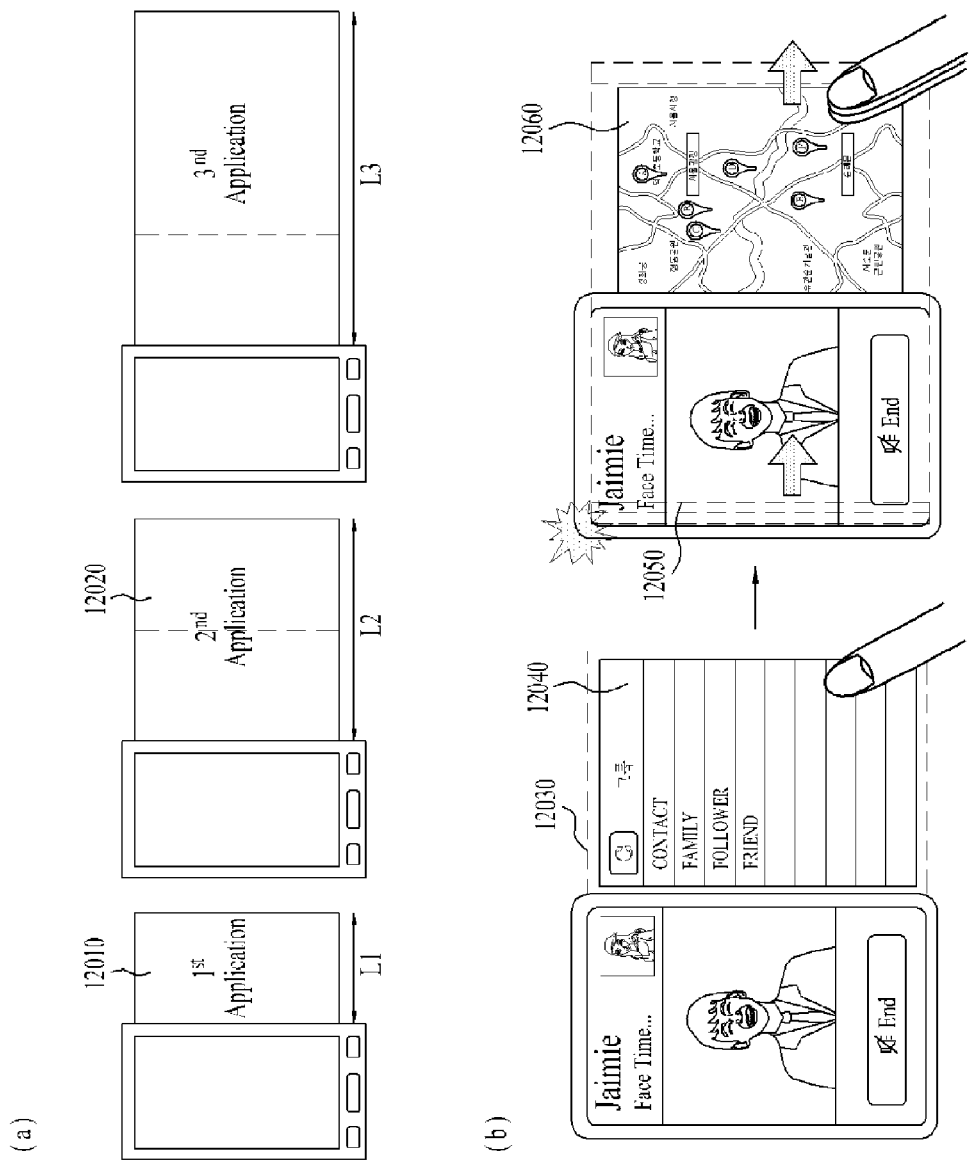

FIG. 13
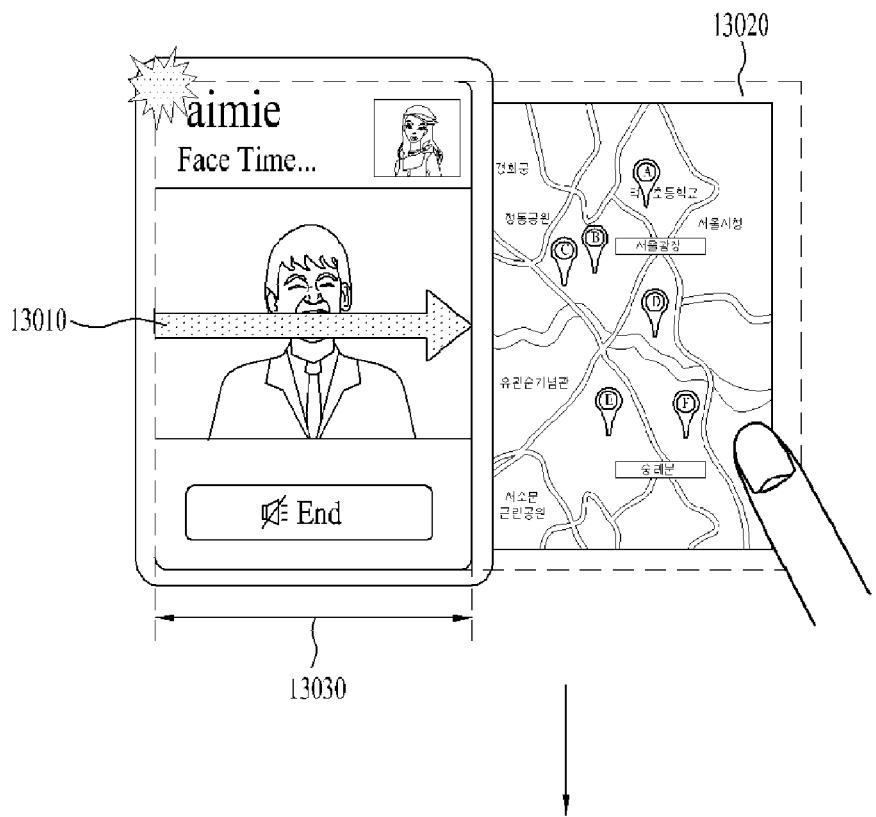
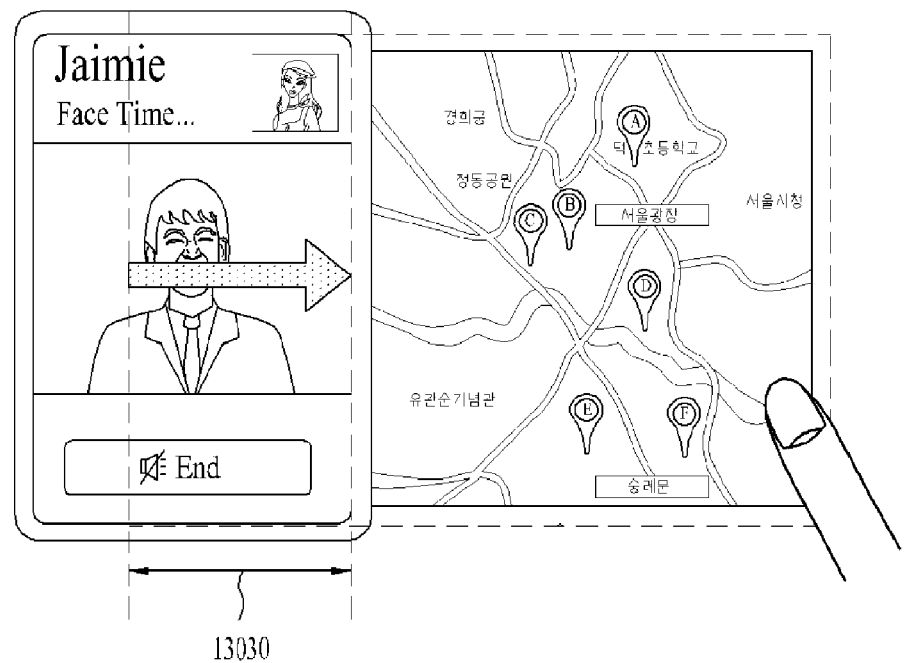

FIG. 16
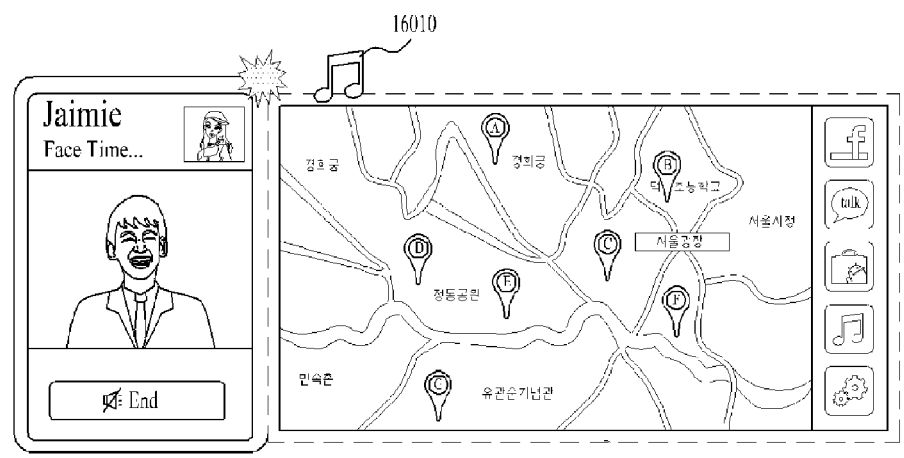
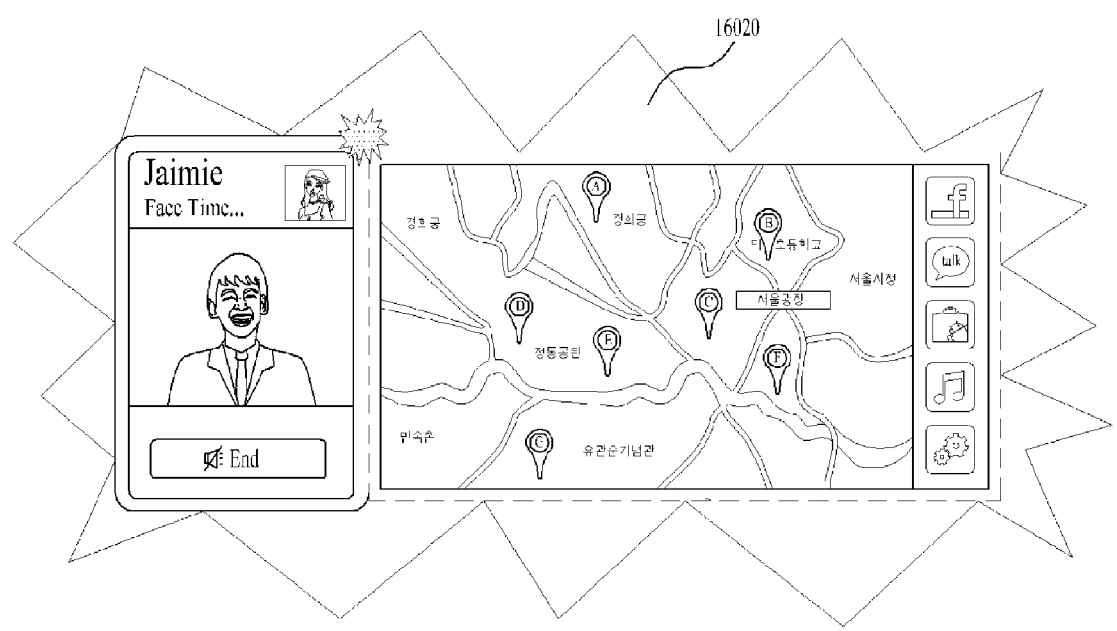

PORTABLE DEVICE AND CONTROL METHOD THEREOF

This application claims the benefit of Korean Patent Application No. 10-2013-0008221, filed on Jan. 24, 2013, which is hereby incorporated by reference as if fully set forth herein.

BACKGROUND

1. Technical Field

Embodiments relate to a portable device and a control method thereof, and particularly to a portable device including a flexible display. More particularly, embodiments relate to a portable device that measures the extended length of a flexible display, obtains the remaining length of the flexible display using the measured length of the flexible display, and displays an indicator configured to indicate the remaining length of the flexible display to notify a user of the additional extension length of the flexible display and a control method thereof.

2. Discussion of the Related Art

In using electronic devices, mobility is one of the most important issues. In recent years, various portable electronic devices exhibiting the same performance as desktop computers as well as mobile phones have been sold. These portable electronic devices are reduced in size and weight with the result that users may obtain various kinds of electronic information during movement.

These portable devices perform various functions in addition to basic functions, such as transmission and reception of data. For this reason, it is necessary for users to more conveniently and accurately control the devices. Particularly for recent portable devices, extension of a display is possible according to the popularization and use of a flexible display panel. Consequently, there is a necessity for a control method that is capable of providing user convenience according to the extension of the display.

SUMMARY

Accordingly, embodiments are directed to a portable device and a control method thereof that substantially obviate one or more problems due to limitations and disadvantages of the related art.

Embodiments provide a portable device that informs a user of the length of a flexible display, which is not extended when the user extends the flexible display, using a virtual contour line to prevent the user from pulling the flexible display to an allowable level or more, thereby preventing the portable device from being dropped or the flexible display from being torn due to impact applied to the portable device by the extension of the flexible display to the allowable level or more and a control method thereof.

Further, embodiments provide a portable device that provides an indicator configured to indicate the width of a flexible display which has not yet been extended when the flexible display is extended and an indicator configured to indicate an additional extension length of a portion, which has not yet been displayed, of an application execution screen displayed on the flexible display, thereby preventing a user from extending the flexible display more than necessary, and a control method thereof.

Further, embodiments provide a portable device that provides various user interfaces, such as output of a specific image as an indicator, an animation effect of the image, a notice sound, a notice vibration, and an animation effect of an execution screen, thereby stimulating user interest in using the portable device, and a control method thereof.

Additional advantages, objects, and features of embodiments will be set forth in part in the description which follows and in part will become apparent to those having ordinary skill in the art upon examination of the following or may be learned from practice of embodiments. The objectives and other advantages of embodiments may be realized and attained by the structure particularly pointed out in the written description and claims hereof as well as the appended drawings.

In an embodiment, a portable device includes a main display, a flexible display, a housing unit configured to contain the flexible display, a measurement unit configured to measure a first length of the flexible display, the first length being a measurement of the flexible display that is extended from the portable device, when the flexible display is extended from the portable device, and a control unit configured to obtain a second length of the flexible display, the second length being a measurement of the flexible display that is not extended from the portable device, using the first length when the flexible display is extended from the portable device, to compare the second length with the width of the main display, and to display an indicator configured to indicate the second length on the main display according to the comparison result.

Also, in an embodiment, a control method of a portable device includes extending the flexible display from the portable device, measuring the a first length of the flexible, the first length being a measurement of the flexible display that is display extended from the portable device, obtaining a second length of the flexible display, the second length being a measurement of the flexible display that is not extended from the portable device using the first length, comparing the second length with the width of the main display, and displaying an indicator configured to indicate the second length on the main display according to the comparison result.

It is to be understood that both the foregoing general description and the following detailed description of embodiments are exemplary and explanatory and are intended to provide further explanation of embodiments as claimed.

BRIEF DESCRIPTION OF THE DRAWINGS

The accompanying drawings, which are included to provide a further understanding of embodiments and are incorporated in and constitute a part of this application, illustrate embodiments and together with the description serve to explain the principle of embodiments. In the drawings:

FIGS. 8 and 9 are views showing portable devices in which indicators are displayed on main displays when flexible displays are extended according to embodiments;

FIGS. 11A and 11B are views showing a portable device in which a flexible display 11010 having a touch sensor mounted thereon is contained according to an embodiment;

FIG. 12 is a view showing a portable device in which execution of an application is controlled based on an extension length of a flexible display according to an embodiment;

FIG. 13 is a view showing a portable device in which an image is displayed as an indicator when a flexible display is extended according to an embodiment;

FIG. 16 is a view showing a portable device in which an indicator is output as a notice sound or a notice vibration according to an embodiment;

DESCRIPTION OF SPECIFIC EMBODIMENTS

Terms used in this specification are general terms selected in consideration of functions and widely used at the present time. However, such terms may vary depending upon intentions of those skilled in the art to which the disclosure pertains, usual practices, or appearance of new technology. In a specific case, some terms may be selected by the applicant of the present application. In this case, meanings of such terms will be described in corresponding paragraphs of the specification. Therefore, it should be noted that terms used in this specification be interpreted based on real meanings of the terms and the disclosure, not simple names of the terms.

Reference will now be made in detail to the preferred embodiments, examples of which are illustrated in the accompanying drawings. It should be noted herein that these embodiments are only for illustrative purposes and the protection scope of the disclosure is not limited or restricted thereto.

With the development of electronic device manufacturing technology, miniaturization of digital devices has been achieved. Embodiments relate to mobile electronic devices. Hereinafter, such mobile electronic devices will be commonly called a portable device. The portable device includes various electronic devices having mobility. For example, the portable device includes electronic devices, such as mobile phones, personal digital assistants (PDAs), laptop computers, tablet PCs, MP3 players, CD players, and DVD players. Hereinafter, the portable device may be simply referred to as a device.

With the development of a display device technology, a flexible display has entered widespread use. The flexible display is a kind of display manufactured using a flexible substrate that can be curved, bent, or rolled without loss of display characteristics unlike a conventional hard display panel. The flexible display may be referred to as electronic paper (e-paper). The flexible display has advantages in that the flexible display is lighter than the conventional hard display panel, exhibits high impact resistance, and can be freely bent.

The substrate constituting the flexible display may be formed of metal foil, very thin glass, or plastic. In particular, a polycarbonate (PC) substrate, polyethylene terephthalate (PET) substrate, polyether sulfone (PES) substrate, polyimide (PI) substrate, polyethylene naphthalate (PEN) substrate, or AriLite substrate may be used as the plastic substrate.

Figure 1:
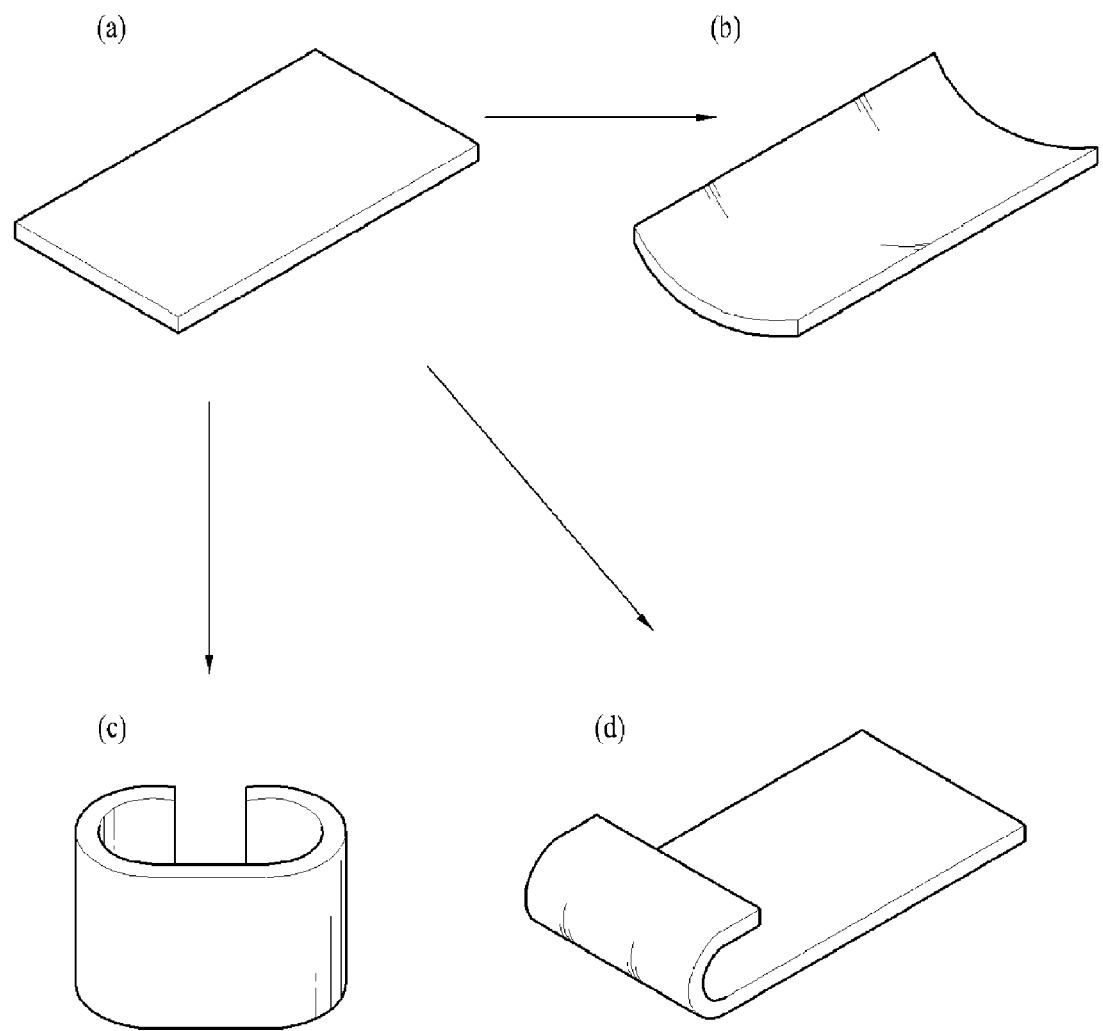
FIG. 1 is a view showing a flexible display according to an embodiment.

FIG. 1 is a view showing a flexible display according to an embodiment. Specifically, the flexible display of FIG. 1 may be classified as a bendable display as shown in FIG. 1(*b*), a foldable display as shown in FIG. 1(*c*), or a rollable display as shown in FIG. 1(*d*) according to flexibility or flexible degree of the flexible display.

When the flexible display is contained in a portable device, it is possible to provide a display having a size greater than that of the portable device. In the following description, the flexible display may be referred to as a flexible display unit, a flexible display screen, or a flexible display panel. The flexible display referred to in the following description means an arbitrary flexible display that is bendable into an arbitrary shape including the shapes shown in FIG. 1 without losing display characteristics. The flexible display may include a touch sensor, which senses a user touch input to the display such that the flexible display is operated according to the sensed user touch input.

Figure 2:
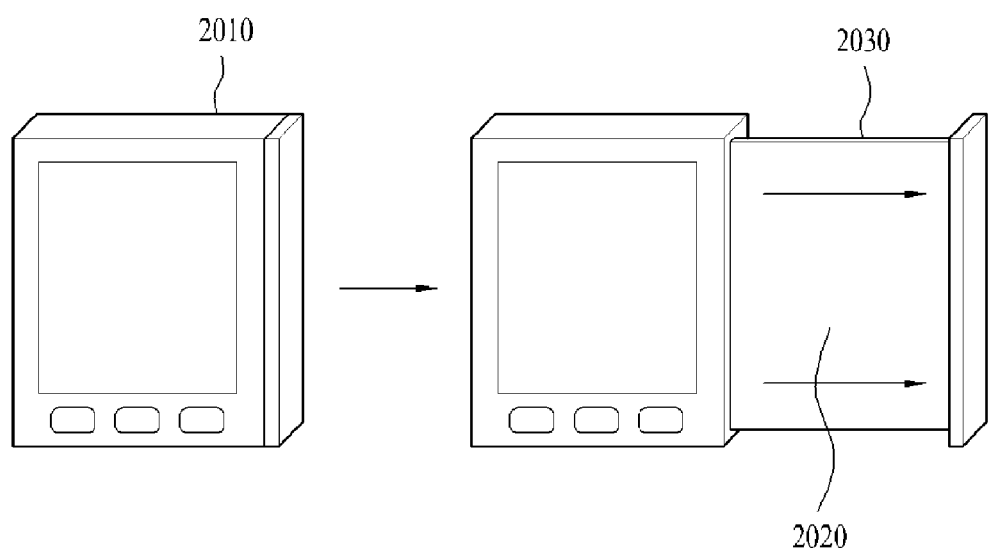
FIG. 2 is a view showing a portable device having a flexible display according to an embodiment contained therein.

FIG. 2 is a view showing a portable device 2010 having a flexible display according to an embodiment contained therein.

In a case in which the flexible display is used, it is possible to provide a display having a size greater than that of the portable device. The flexible display is bendable, and therefore, the flexible display may be contained in the portable device in a state in which the flexible display has a small volume. That is, the flexible display as shown in FIG. 1 may be folded or rolled such that the flexible display is contained in the portable device. When a user wishes to use the display or a larger display, the flexible display may be extended from the portable device.

Also, the portable device 2010 may be provided at the front thereof with a main display. Buttons may be disposed at arbitrary positions of the portable device 2010. In particular, the entirety or some of the front of the portable device 2010 may be configured as a display. In this case, the buttons may be displayed as display images.

The portable device 2010 may contain a flexible display 2020 and a sliding unit 2030. The sliding unit 2030 may enable the flexible display 2020 to be extended straightly in a sliding fashion. The entirety or some of the sliding unit 2030 may be attached to the rear of the flexible display 2020. Also, in a case in which the user wishes to use an additional display, the flexible display 2020 may be extended manually or automatically.

Hereinafter, the device having the flexible display as shown in FIG. 2 will be described as an example of the portable device. However, the shape of the portable device is not restricted to the shape shown in FIG. 2. The portable device may be configured in various shapes including an extendable flexible display.

Figure 3:
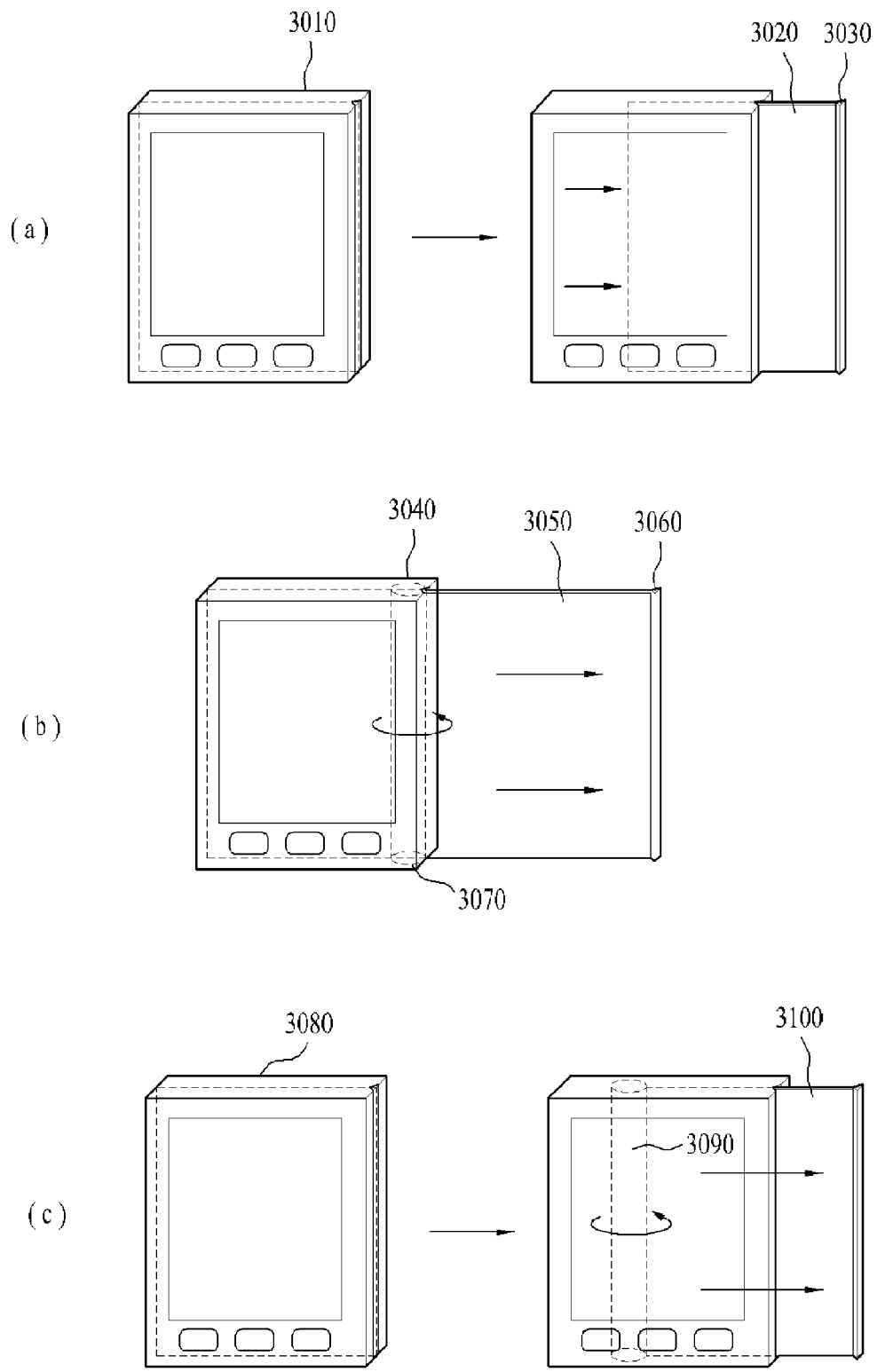
FIG. 3 is a view showing a portable device according to an embodiment.

FIG. 3 is a view showing a portable device 3010 according to an embodiment. FIG. 3 is a view showing a flexible display 3020 provided at the portable device 3010 and a housing unit 3070 to contain the flexible display 3020 in addition to the construction of FIG. 2.

FIG. 3(a) is a view showing a case in which the flexible display 3020 is contained in the portable device 3010 in a folded fashion. When a user wishes to extend the flexible display 3020, the user may extend the flexible display 3020 using a grip 3030 provided at the flexible display 3020. In the portable device 3010, the flexible display 3020 is contained in the housing unit 3070. In the portable device 3010, the housing unit 3070 is a component to contain the flexible display 3020 in a folded fashion or in a rolled fashion. FIG. 3(a) is a view showing a case in which the flexible display 3020 is folded or rolled as if folded such that the flexible display 3020 is contained in the portable device 3010. The housing unit 3070 may automatically extend the flexible display 3020 based on user control of the portable device.

FIG. 3(b) is a view showing a case in which a flexible display 3050 is contained in a portable device 3040 in a rolled fashion. When a user wishes to extend the flexible display 3050, the user may extend the flexible display 3050 using a grip 3060 provided at the flexible display 3050. In FIG. 3(b), the flexible display 3050 is contained in the housing unit 3070 in a rolled fashion. In this case, the housing unit 3070 may also automatically extend the flexible display 3050 based on user control of the portable device.

FIG. 3(c) is a view showing a case in which a flexible display 3100 is contained in a portable device 3080 in a rolled and folded fashion. In other words, FIG. 3(c) is a view showing a combination of FIGS. 3(a) and 3(b). First, in a case in which the flexible display 3100 is extended, the flexible display 3100 rolled up in a housing unit 3090 is rolled out such that the flexible display 3100 is extended. In a case in which the flexible display 3100 rolled up in the housing unit 3090 is completely rolled out from the housing unit 3090, the housing unit 3090 may be unfolded as shown in FIG. 3(a). Specifically, the housing unit 3090 may be unfolded with the result that the flexible display 3100 is completely exposed from the portable device 3080. It is possible to more effectively contain the flexible display 3100 having a predetermined length or more into the portable device 3080 using the receiving methods of FIGS. 3(a) and 3(b).

When the flexible display 3100 is extended, the portable device 3080 may display an image based on the area or size of the extended display. In this specification, the image means an image that can be visually expressed, including a still image and/or a moving image that can be displayed on the display panel.

While the flexible display 3100 is contained in the portable device 3080, the flexible display 3100 may not display an image. As a result, power consumption may be lowered, and unnecessary heat generation may be reduced. When the flexible display 3100 is extended, therefore, the flexible display 3100 is extended from the housing unit 3090 and displays an image in a region a user can view. When the flexible display 3100 is rolled out from the portable device 3010 as previously described, it is possible to display an image on a portion of the display exposed from the portable device 3010. In order to display an extended portion of the flexible display 3100 when the flexible display 3100 is extended, it is necessary for the portable device 3010 to recognize the area or length of the extended flexible display 3100. Consequently, the portable device 3010 may measure the extended length of the flexible display 3100 or measure the area of the flexible display 3100 based on the measured length of the flexible display 3100 using the sensor unit as previously described or a measurement unit.

The portable device 3010 includes a measurement unit configured to measure the extended length of the portable device 3010. According to embodiments, the measurement unit may be disposed inside or outside the portable device. Alternatively, the measurement unit may be disposed adjacent to the housing unit 3090 of the portable device, from which the flexible display 3100 is extended.

The portable device 3010 and the flexible display 3100 shown in FIGS. 2 and 3 are configured as an embodiment. Unlike the drawings, a folded flexible display 3100 may be extended. Unlike the drawings, a rolled flexible display 3100 may be rolled out. That is, the shape in which the flexible display is contained is not limited to the above embodiment, and the flexible display may be contained in various shapes. Also, the housing unit 3090 may be disposed at a position different from those of FIGS. 2 and 3.

In this specification, the housing unit 3090, in which the extendable flexible display 3100 is contained, is explained, and the portable device including the housing unit 3090 is explained.

Figure 4:
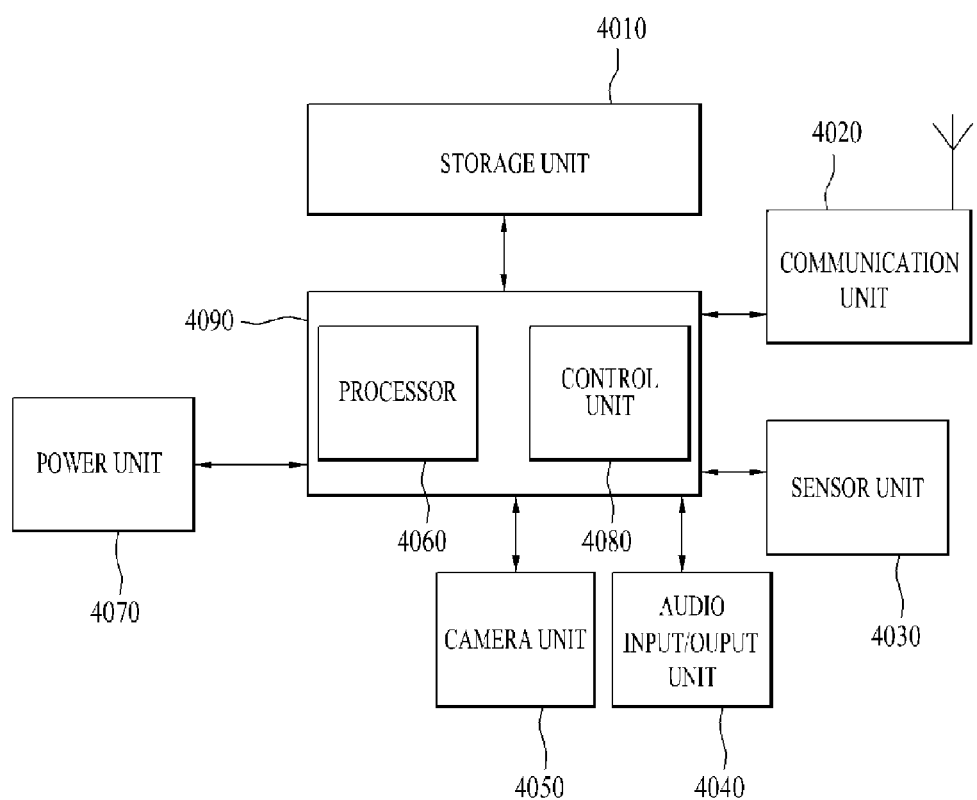
FIG. 4 is a block diagram of a portable device according to an embodiment.

FIG. 4 is a block diagram of a portable device according to an embodiment. Referring to FIG. 4, the portable device includes a storage unit 4010, a communication unit 4020, a sensor unit 4030, an audio input/output unit 4040, a camera unit 4050, a processor 4060, a power unit 4070, and a control unit 4080.

The storage unit 4010 may store various digital data, such as videos, audios, pictures, moving images, and applications. The storage unit 4010 may be realized by various digital data storage spaces, such as a flash memory, a hard disk drive (HDD), and a solid state drive (SSD).

Also, embodiments relate to a length indicator of the flexible display. Consequently, the storage unit 4010 may store information regarding the width of the flexible display and the total width of an application execution screen.

The communication unit 4020 may perform communication with an external device outside the portable device using various protocols to transmit and contain data to/from the external device. The communication unit 4020 may be connected to an external network in a wired or wireless fashion to transmit/contain digital data to/from the external network.

The sensor unit 4030 may transmit a user input or the surroundings recognized by the portable device to the control unit 4080 using a plurality of sensors mounted to the portable device. The sensor unit 4030 may include a plurality of sensing means. In an embodiment, the sensing means may include a gravity sensor, a geomagnetism sensor, a motion sensor, a gyro sensor, an acceleration sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, and a touch sensor.

The various sensing means as described above may be commonly known as the sensor unit 4030. The sensor unit 4030 may sense various user inputs and the surroundings of the portable device and transmit the sensing result to the portable device such that the portable device can perform an operation based thereupon. The above-mentioned sensors may be included in the portable device as an individual element or in a state in which one or more sensors are combined into an element.

In this specification, the sensor unit 4030 may include a measurement unit configured to measure the extended area or length of the flexible display or a measurement sensor unit configured to sense the extended area or length of the flexible display. In a case in which the flexible display is extended, the measurement unit may measure the length of the flexible display extended from the portable device. On the other hand, the measurement unit may measure the length of the flexible display in the portable device. Alternatively, the sensor unit 4030 may include a sensor unit configured to sense that the flexible display has been extended to a predetermined length or more. This sensor unit may be disposed at a specific point on the flexible display to detect that the flexible display has been extended to the predetermined length or more and to transmit a specific electric signal to the control unit.

Meanwhile, embodiments relate to an indicator configured to indicate the length of the flexible display which is not extended. In this case, it is necessary to obtain the length of the flexible display that can be additionally extended. In this specification, therefore, a method of acquiring an additional extension length of the flexible display will hereinafter be described, and embodiments of the measurement unit and the sensor unit will hereinafter be described.

The measurement unit may be provided at various positions of the portable device, such as the housing unit, the flexible display, and the side of the flexible display. Also, various kinds of measurement sensors may be used as the measurement unit. A measurement method may be changed based on the position of the measurement unit or the kind of the sensor used as the measurement unit.

In a case in which the flexible display is rolled up in the housing unit 3070, the measurement unit may measure or sense angular velocity of the housing unit 3070 at which the housing unit 3070 is rotated to measure the extended length of the flexible display. A gyro sensor or a gyroscope may be used to measure the angular velocity of the housing unit 3070. The control unit 4080 may calculate the total length of the housing unit by which the housing unit is rotated based on the measured angular velocity of the housing unit 3070. Alternatively, the measurement unit may sense the diameter or radius of the housing unit in which the flexible display is rolled up or measure the weight of the housing unit in which the flexible display is rolled up to measure to what extent the flexible display is rolled up in the housing unit. That is, the measurement unit may measure physical factors of the flexible display rolled up in the housing unit to obtain the unextended length of the flexible display. The housing unit 3070, in which the flexible display is contained, may be provided at an arbitrary position in the portable device.

Also, the measurement unit may be a bending sensor configured to sense bending of the flexible display. The measurement unit may measure the unfolded length or area of the flexible display. Alternatively, it is possible to measure the extended length of the flexible display based on touch extended from the housing unit using a touch sensor provided at the flexible display.

Also, the measurement sensor may be a sensor using a strain gauge. Force per unit area is stress, and a ratio of the changed length to the original length of an object is strain. When force is applied to an object, the shape of the object is changed. At this time, a strain gauge may be used to measure a degree of change in shape of the object and thus indirectly measure the force applied to the object. Various kinds of strain gauges may be employed. Among such strain gauges is a metallic wire or foil resistance gauge, which is widely used. The metallic wire or foil resistance gauge may measure length using characteristics of an object in which the resistance value of the object is changed as the length of the object is changed.

Also, various sensors, such as a touch sensor, an infrared/ultraviolet sensor, a phototransistor, a photoconductive cell, and a positioning element, disposed on the flexible display may be used as the measurement sensor. The measurement unit may detect whether the flexible display has been extended to a predetermine length or more and generate an electric signal based on the detection result. For example, it is assumed that the measurement unit is an optical sensor. As the flexible display is extended, the measurement unit disposed at a specific position may be exposed from the portable device. At this time, the measurement unit may detect optical energy outside the portable device and generate a specific electric signal. By detecting the electric signal transmitted from the measurement unit, the portable device may read information regarding the position of the specific sensor on the flexible display. The portable device may obtain information regarding the extended length or additional extension length of the flexible display at the time of detection using the read information. In addition, in a case in which a signal transmitted by a specific optical sensor is detected, the portable device may display an indicator without an additional process to inform a user of the additional extension length of the flexible display.

Furthermore, the measurement unit may include measurement sensors that can measure movement distance, length, and angular velocity, such as a laser length measurement sensor, a LVDP, and a potentiometer. However, the measurement unit is not restricted to the above-mentioned sensors, and the above-mentioned measurement sensors merely constitute an embodiment of the measurement unit.

The audio input/output unit 4040 may include an audio output means, such as a speaker, and an audio input means, such as a microphone. The audio input/output unit 4040 may perform audio output from the portable device and audio input to the portable device. The audio input/output unit 4040 may be used as an audio sensor.

The camera unit 4050 may take a picture or a moving image. According to embodiments, the camera unit 4050 may be selectively provided. The camera unit 4050 may be used as the above-mentioned motion sensor or visual sensor.

The processor 4060 may execute various applications stored in the storage unit 4010 and process data in the portable device.

The power unit 4070 is a power source connected to a battery in the portable device or an external power supply. The power unit 4070 may supply power to the portable device.

The control unit 4080 may control the above-mentioned units of the portable device and control transmission and reception of data between the units. Also, the control unit 4080 may control output of an image displayed on the display screen.

When the flexible display is extended, the control unit 4080 may control the image to be displayed according to the extended area of the flexible display. Specifically, the control unit 4080 may adjust the size or resolution of the image based on the extended size of the flexible display and control the image to be displayed based on the adjusted size or resolution or another image based on the adjusted size or resolution. Also, the control unit 4080 may control the displayed image. For example, the control unit 4080 may control the image to be displayed on the display panel or apply an animation effect to the displayed image.

Also, the control unit 4080 may control vibration or audio to be output according to the extended area or size of the flexible display. Specifically, the control unit 4080 may control kind, strength, and intensity of the output vibration or audio according to the extended size of the flexible display.

The processor 4060 and the control unit 4080 may be integrated into a single chip, which functions as both the processor 4060 and the control unit 4080. Hereinafter, the single chip which functions as both the processor 4060 and the control unit 4080 may be referred to as the control unit 4080.

FIG. 4 is a block diagram of an embodiment. The blocks shown in the drawing individually indicate the elements of the portable device. Consequently, the elements of the portable device as previously described may be combined into a single chip or a plurality of chips based on design of the portable device.

Figure 5:
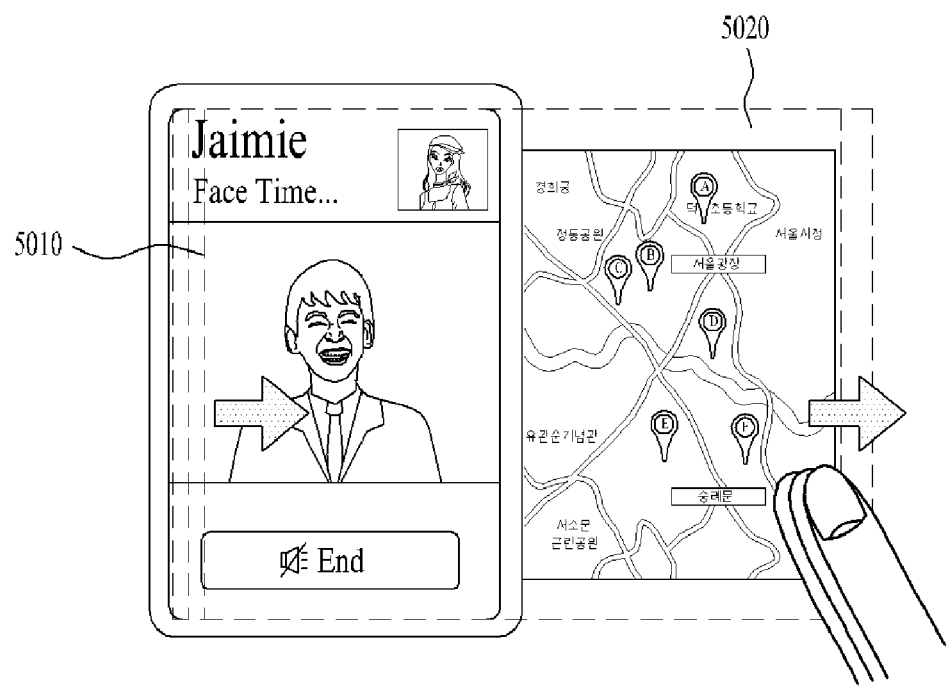
FIG. 5 is a view showing an embodiment in which an indicator is displayed when a flexible display is extended according to an embodiment.

FIG. 5 is a view showing an embodiment in which an indicator 5010 is displayed when a flexible display 5020 is extended according to an embodiment. Specifically, FIG. 5 is a view showing an embodiment of an indicator 5010 moving according to the extension or reduction of a flexible display 5020.

In a case in which the flexible display 5020 is rolled up in the portable device, a user may not exactly know the rolled length of the flexible display 5020. For this reason, the flexible display 5020 may be excessively extended with the result that power consumption may be caused or the flexible display 5020 or the portable device may be damaged due to impact caused by excessive extension of the flexible display 5020.

In order to solve the above problem, as shown in FIG. 5, the portable device may display a virtual contour line indicator 5010 of the flexible display 5020 and may provide an animation effect in which the indicator 5010 is moved left or right as the user extends or reduces the flexible display 5020. The indicator 5010 may enable the user to intuitively know an extended length limit of the flexible display 5020.

Meanwhile, an indicator configured to indicate the length of an application execution screen may also be included in addition to the indicator 5010 configured to indicate the extended length limit of the flexible display. Specifically, when the flexible display is extended, the indicator may indicate the length of the flexible display which is to be additionally extended to display the entirety of the application execution screen. The two indicators may be simultaneously or individually displayed according to the length of the application execution screen. Specific embodiments regarding operations of the two indicators will hereinafter be described with reference to FIG. 10.

The indicator 5010 shown in FIG. 5 is configured as an embodiment. Unlike FIG. 5, the indicator may be displayed in various shapes, such as a virtual contour line and a specific image. Also, an image or a shape of the indicator or a graphical effect applied to the indicator may be set by the user and is not limited to the above embodiment.

Meanwhile, in order to output the above indicator, first, it is necessary to obtain an additional extension length of the flexible display. The additional extension length of the flexible display may be 1) obtained using the extended length of the flexible display or 2) directly measured by the measurement unit. In a case in which the additional extension length of the flexible display is measured by the measurement unit, an additional operation or process is not necessary to indicate the indicator. On the other hand, in a case in which the additional extension length of the flexible display is obtained using the extended length of the flexible display, an additional operation or process may be necessary. The additional operation or process will hereinafter be described with reference to FIGS. 6 to 9.

Figure 6:
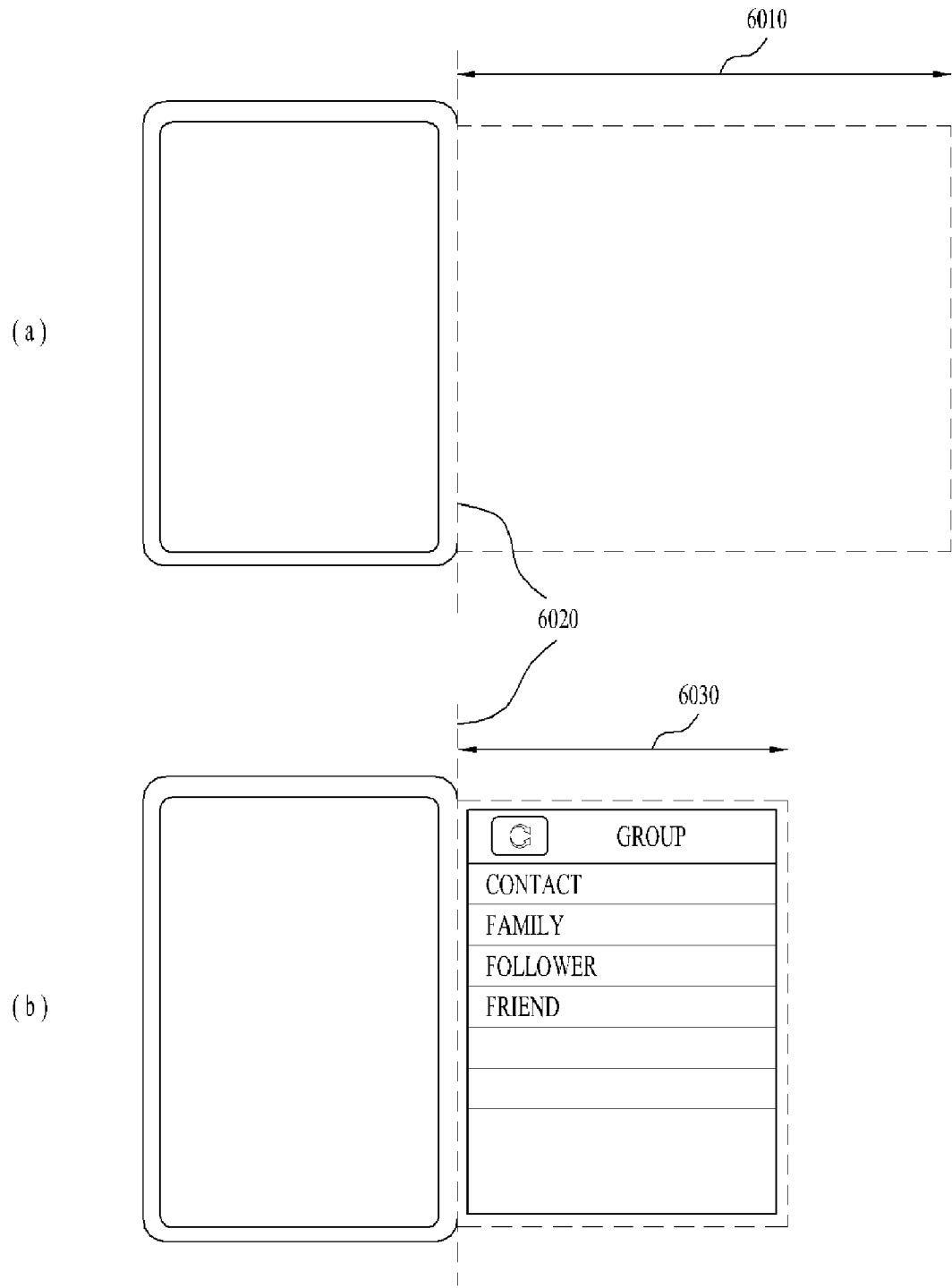
FIGS. 6 and 7 are views showing portable devices, flexible displays of which are extended according to embodiments.

FIG. 6 is a view showing a portable device, a flexible display of which is extended according to an embodiment. FIG. 6(a) is a view showing an embodiment of a portable device, a flexible display of which is extended to an extended length limit 6010. In an embodiment, the extended length limit 6010 may be an extended length 6010 of the flexible display in a case in which the flexible display is extended to the maximum. Specifically, the extended length limit 6010 of the flexible display may be an extended length of the flexible display in a case in which the flexible display is extended in a state in which impact is not applied to the flexible display or the portable device.

Meanwhile, the total width of the flexible display means, in this specification, an extended length 6010 of the flexible display extended from a boundary line 6020 between the portable device and the flexible display to the extended length limit of the flexible display.

FIG. 6(b) is a view showing an embodiment of a portable device, a flexible display of which is extended to an extended length limit 6030 such that the entirety of an application execution screen is displayed.

In an embodiment, the extended length limit 6030 may be a length of the flexible display to be extended to display the entirety of the application execution screen on the flexible display. Alternatively, the extended length limit 6030 may be the minimum extended length of the flexible display to be extended to display the entirety of the application execution screen. Meanwhile, displaying the entirety of the application execution screen may mean that the flexible display is extended by the total width of the application execution screen to display the entirety of the application execution screen on the flexible display. The total width of the application execution screen means, in this specification, a length of the flexible display extended from a boundary line 6020 between the portable device and the flexible display. Specifically, the total width of the application execution screen may mean an extended length 6030 of the flexible display when the flexible display is extended to display the entirety of the application execution screen.

Meanwhile, the lengths mentioned in FIG. 6 may mean substantial lengths, including lengths within a predetermined error range as well as exact lengths.

Figure 7:
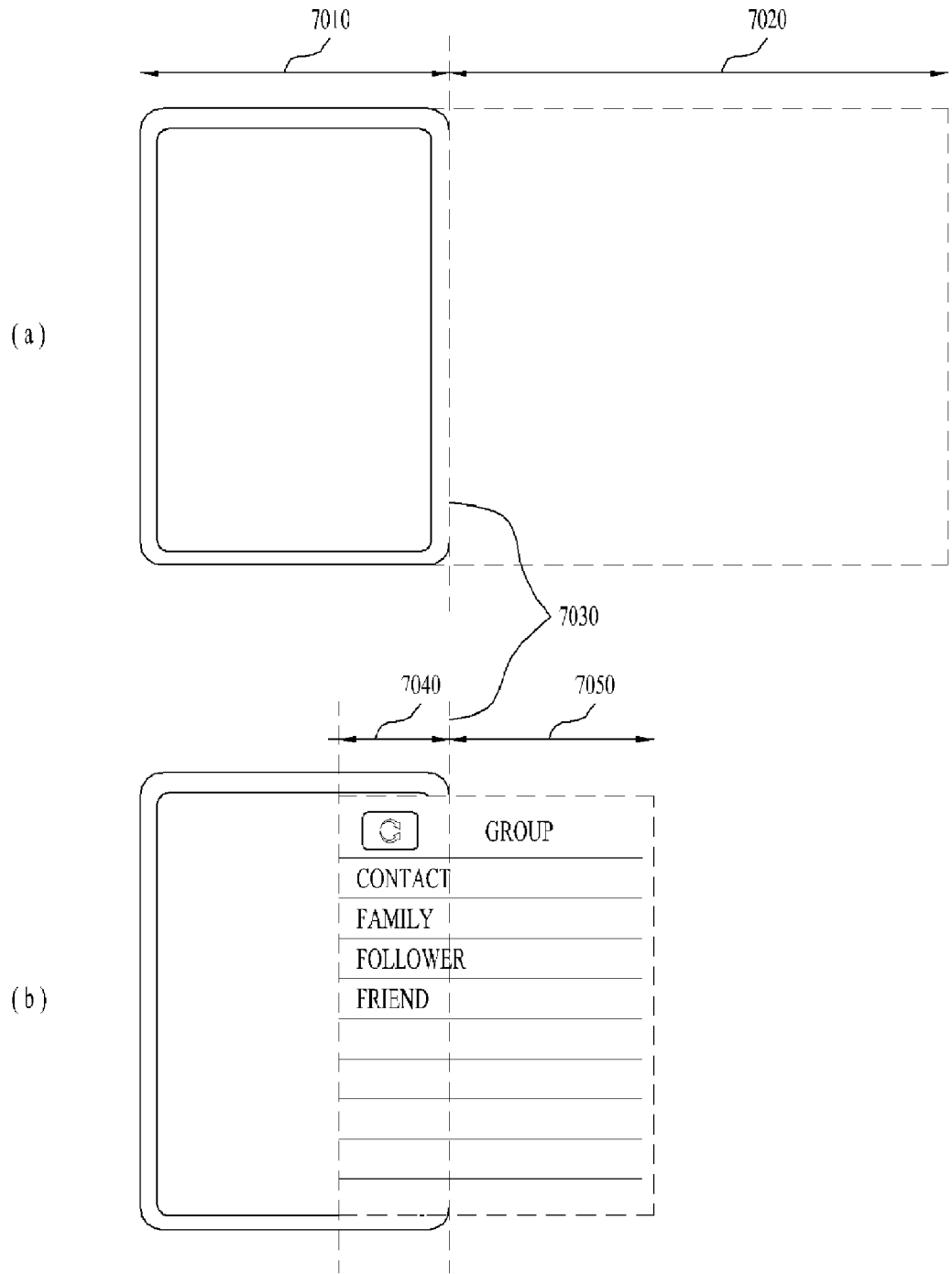

FIG. 7 is a view showing a portable device, a flexible display of which is extended according to an embodiment. Specifically, FIG. 7 is a view showing an embodiment of elements necessary to obtain an additional extension length of a flexible display indicated by an indicator. In particular, FIG. 7(a) is a view showing an additional extension length of the flexible display until the flexible display is extended to an extended length limit, and FIG. 7(b) is a view showing elements that can be used to obtain an additional extension length of the flexible display until the entirety of an application execution screen is displayed on the flexible display.

In FIG. 7(a), an extended length 7020 of the flexible display may mean a length 7020 of the flexible display which is extended from a boundary line 7030 between the portable device and the flexible display. In other words, the extended length 7020 of the flexible display may mean a substantially straight length 7020 of the flexible display in a direction in which the flexible display is extended and reduced.

Also, an unextended length 7010 of the flexible display may mean a length 7010 of the flexible display which is not extended from the boundary line 7030 between the portable device and the flexible display. Specifically, the unextended length 7010 of the flexible display is a length obtained by subtracting the extended length 7020 of the flexible display from the total width of the flexible display. This length may be a substantially straight length 7010 of the flexible display in the direction in which the flexible display is extended and reduced.

In FIG. 7(b), an extended length 7050 of the flexible display may mean a length 7050 of the flexible display which is extended from a boundary line 7030 between the portable device and the flexible display in the same manner as shown in FIG. 7(a).

Also, an unextended length 7040 of the flexible display may mean a length 7040 of the flexible display which has not yet been displayed on the total width of an application execution screen. Specifically, the unextended length 7040 of the flexible display is a length 7040 obtained by subtracting the extended length 7050 of the flexible display from the total width of the application execution screen. This length may also be a substantially straight length 7040 of the flexible display in the direction in which the flexible display is extended and reduced.

As shown in FIGS. 7(*a*) and 7(*b*), the unextended lengths 7010 and 7040 of the flexible display include 1) the length 7010 which is not extended from the boundary line 7030 between the portable device and the flexible display and 2) the length 7040 of the flexible display which has not yet been displayed on the total width of the application execution screen.

The above-mentioned lengths 7010, 7020, 7040, and 7050 may be used to operate indicators in embodiments. The lengths 7010, 7020, 7040, and 7050 may be directly obtained by the measurement unit or obtained by the control unit. An acquisition method using the control unit will hereinafter be described in detail with reference to FIGS. 8 and 9.

Meanwhile, the lengths 7020 and 7050 of the flexible display extended from the boundary line 7030 between the portable device and the flexible display may be referred to as extension lengths of the flexible display, and the lengths 7010 and 7040 of the flexible display which are not extended from the boundary line 7030 between the portable device and the flexible display may be referred to as additional extension lengths of the flexible display, for the convenience of description and for correspondence of terms between the specification and claims.

FIG. 8 is a view showing a portable device in which an indicator 8010 is displayed on a main display when a flexible display 8020 is extended according to an embodiment. Specifically, FIG. 8 is a view showing an embodiment in which an indicator 8010 configured to indicate an additional extension length 8030 of a flexible display is displayed on a main display as a virtual contour line of the flexible display.

The indicator 8010 is displayed while the additional extension length 8030 of the flexible display is equal to or less than the width of the main display. The additional extension length 8030 of the flexible display may be directly measured by the measurement unit or obtained by the control unit. In a case in which the additional extension length 8030 of the flexible display is obtained by the control unit, the additional extension length 8030 of the flexible display may be obtained using the total width of the flexible display and an extension length 8040 of the flexible display. The extension length 8040 of the flexible display may be obtained by the measurement unit.

Figure 9:
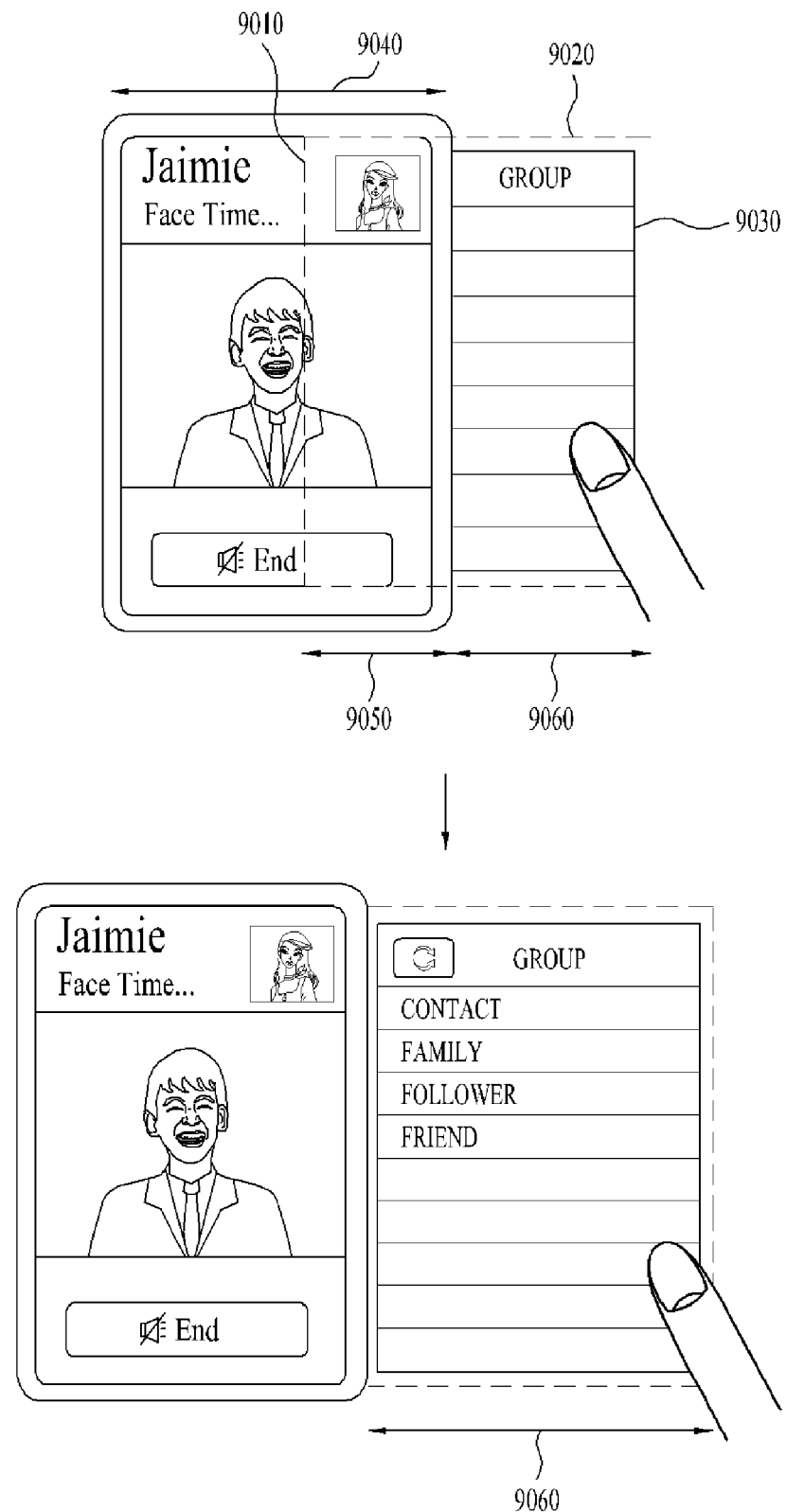

FIG. 9 is a view showing a portable device in which an indicator 9010 is displayed on a main display when a flexible display 9020 is extended according to an embodiment. Specifically, FIG. 9 is a view showing an embodiment in which an indicator 9010 configured to indicate an additional extension length 9050 of an application execution screen on a flexible display is displayed on a main display as a virtual contour line of the application execution screen.

The indicator 9010 is displayed while the additional extension length 9050 the application execution screen on the flexible display is equal to or less than the width 9040 of the main display. The additional extension length 9050 of the flexible display may be directly measured by the measurement unit or obtained by the control unit. In a case in which the additional extension length 9050 of the flexible display is obtained by the control unit, the additional extension length 9050 of the flexible display may be obtained using the total width of the application execution screen and an extension length 9060 of the flexible display. The extension length 9060 of the flexible display may be obtained by the measurement unit.

In FIGS. 8 and 9, the indicators may operate in correspondence to the extension or reduction of the additional extension lengths 8030 and 9050 of the flexible display. In other words, when a user extends or reduces the flexible display 9020, the indicators 8010 and 9010 may move in a direction in which the flexible display 9020 is extended or reduced by the changed additional extension lengths 8030 and 9050 of the flexible display. For example, the indicators 8010 and 9010 may move on the main display left or right in a direction in which the flexible display is slid by the changed additional extension lengths 8030 and 9050 of the flexible display. Visual effects of the indicators 8010 and 9010 may enable a user to intuitively know the additional extension lengths 8030 and 9050 of the flexible display.

Also, the indicators 8010 and 9010 may be displayed as a virtual contour line of the flexible display 9020. The virtual contour line may be a virtual line indicating the contour of the flexible display. The virtual contour line may be expressed in various line shapes, such as a broken line, a solid line, a dashed dotted line, and a dash-dot-dotted line. Also, the virtual contour line may be expressed in various colors, sizes, and forms. The virtual contour line may be variously changed based on user setting to provide various mobile user interface. Consequently, the construction of the virtual contour line is not limited to the above embodiments.

Also, the indicators 8010 and 9010 may not be displayed while the flexible display is not moved. This is because continuous display of the indicators 8010 and 9010 may hide a portion of the application execution screen with the result that it may be difficult to secure the user's view with respect to the main display. However, display timing of the indicators 8010 and 9010 and display time of the indicators 8010 and 9010 may be variously set by the user. Consequently, the display timing of the indicators 8010 and 9010 and display time of the indicators 8010 and 9010 are not limited to the above embodiments. For example, the indicators 8010 and 9010 may be set such that the indicators 8010 and 9010 do not disappear but are continuously displayed on the main display even while the extension of the flexible display is stopped.

Figure 10:
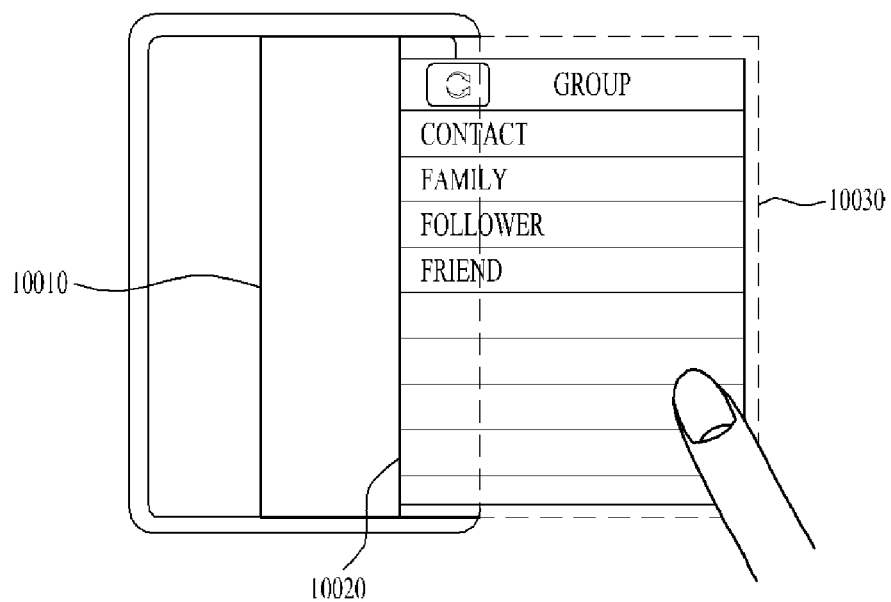
FIG. 10 is a view showing a portable device in which indicators are displayed as virtual contour lines when a flexible display is extended according to an embodiment.

FIG. 10 is a view showing a portable device in which indicators 10010 and 10020 are displayed as virtual contour lines when a flexible display 10030 is extended according to an embodiment. Specifically, FIG. 10 is a view showing an embodiment in which two indicators 10010 and 10020 are simultaneously displayed.

In a case in which the additional extension length 8030 of the flexible display, is equal to or less than the width of the main display as shown in FIG. 8 and the additional extension length 9050 of the application execution screen on the flexible display, is equal to or less than the width 9040 of the main display as shown in FIG. 9, the two indicators 10010 and 10020 may be simultaneously displayed on a main display. Alternatively, the two indicators 10010 and 10020 may be individually displayed. The indicators 10010 and 10020 may be individually displayed or animation effects may be individually applied to the indicators 10010 and 10020 according to the change of the additional extension length of the flexible display. As the two indicators 10010 and 10020 are simultaneously displayed, it is possible for a user to intuitively know both the additional extension length 8030 of the flexible display and the additional extension length 9050 of the application execution screen at once.

Figure 11A:
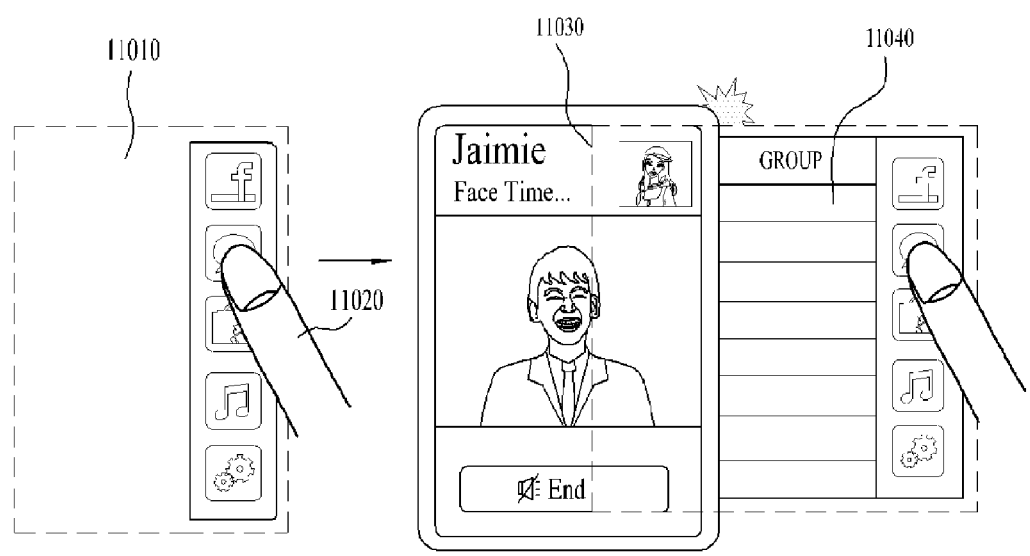

FIGS. 11A and 11B are views showing a portable device in which a flexible display 11010 having a touch sensor mounted thereon is contained according to an embodiment.

FIG. 11A is a view showing an embodiment in which, when a touch input of a user 11020 on a flexible display 11010 is sensed, a portable device may display an indicator 11030 by executing a command corresponding to the touch input.

First, when a touch input of the user 11020 with respect to an icon displayed on the flexible display 11010 is sensed, the touch sensor may transmit sensing information to the control unit 4080. The portable device may execute a command corresponding to the touch input and display an application execution screen 11040 according to the execution of the command on the flexible display 11010.

For example, in a case in which the user extends the flexible display while touching a telephone number icon on the flexible display, the portable device may execute a telephone number application and display an application execution screen 11040 on the flexible display. At this time, the portable device may read information regarding the total width of the application execution screen 11040 stored in the storage unit 4010 to obtain an additional extension length of the flexible display. A method of obtaining the additional extension length of the flexible display is the same as or equivalent to those shown in FIGS. 8 and 9.

FIG. 11B is a view showing an embodiment in which, when an application execution screen displayed on the flexible display is changed to another application execution screen, an indicator configured to indicate the changed application execution screen may be output. Specifically, FIG. 11B is a view showing an embodiment in which, when an application execution screen is changed to another application execution screen according to a specific input, an indicator configured to indicate an additional extension length of the changed application execution screen may be output.

For example, in a case in which a user 11070 extends the flexible display while touching a map icon 11060 as shown in FIG. 11B, the portable device may change the telephone number application execution screen 11050, which is being displayed, to a map application execution screen. In a case in which an application execution screen is changed to another application execution screen, the portable device may display an indicator 11080 configured to indicate the additional extension length of the changed application execution screen. A method of acquiring the additional extension length of the application execution screen on the flexible display is the same as or equivalent to those shown in FIGS. 7(b) and 9.

In a case in which the additional extension length of the changed application execution screen on the flexible display is equal to or greater than the width of the main display, the indicator 11080 may not be displayed immediately when the change of the application execution screen is completed. In a case in which the flexible display is extended and the additional extension length of the application execution screen on the flexible display is equal to or less than the width of the main display, the indicator may be displayed. However, in a case in which the additional extension length of the changed application execution screen on the flexible display is equal to or less than the width of the main display, the indicator 11080 may be displayed on the main display immediately when the change of the application execution screen is completed.

The change from an application execution screen to another application execution screen may be achieved by various user inputs, such as touching an icon displayed on the flexible display as previously described or touching an icon displayed on the main display. Consequently, the change from an application execution screen to another application execution screen is not limited to the above embodiment.

FIG. 12 is a view showing a portable device in which execution of an application is controlled based on an extension length of a flexible display 12030 according to an embodiment. Specifically, FIG. 12 is a view showing an embodiment of a portable device in which, when an application execution screen is changed to another application execution screen 12060 as a flexible display 12030 is extended, an indicator 12050 configured to indicate the changed application execution screen 12060 is displayed.

In this embodiment, first, it is premised that execution of an application is controlled based on unit lengths L1, L2, and L3 of the flexible display 12030 as shown in FIG. 12(a). An application may be displayed on the flexible display by executing a command corresponding to a user input. In this embodiment, however, the extended lengths L1, L2, and L3 of the flexible display 12030 may be a user input. The portable device may execute an application in correspondence to the user input.

For example, in a case in which the flexible display 12030 is extended by the first unit length L1, the portable device may be set to display a first application 12010. Alternatively, when the extension length of the flexible display is less than the first unit length L1, the portable device may be set to display the first application 12010. If the flexible display 12030 is extended by a second unit length L2, which is greater than the first unit length L1, a second application 12020 corresponding to the second unit length L2 may be displayed. The unit lengths L1, L2, and L3 and the applications 12010 and 12020 executed based on the unit lengths L1, L2, and L3 may be variously set by a user.

While the flexible display is extended within the respective unit lengths L1, L2, and L3, meanwhile, indicators configured to indicate the applications 12010 and 12020 displayed on the flexible display may be output.

FIG. 12(b) is a view showing an embodiment of a portable device in which, when an application execution screen 12040 is changed to another application execution screen 12060 on the flexible display, an indicator 12050 configured to indicate the changed application execution screen 12060 is output. Specifically, FIG. 12(b) is a view showing an embodiment in which, when the portable device is extended to the first unit length L1 more, the change of the second application execution screen 12060 is performed, and the indicator 12050 configured to indicate the changed application execution screen 12060 is displayed. In this embodiment, a virtual contour line is displayed as the indicator. However, the indicator 12050 may be displayed in various forms as previously described. For example, the indicator 12050 may be output as a notice sound or a notice vibration.

FIG. 13 is a view showing a portable device in which an image 13010 is displayed as an indicator when a flexible display 13020 is extended according to an embodiment.

The image indicator 13010 may be displayed in correspondence to an additional extension length 13030 of the flexible display in a manner identical or similar to the virtual contour line indicators 8010 and 9010 as previously described. Various images may be displayed as the indicator, and the indicator may be set by a user. In this embodiment, an arrow is shown as an example of the image used as the indicator.

Also, various animation effects may be applied to the image indicator 13010. An animation effect may be applied to change the position, length, size, color, transparency, brightness or luminosity of the image indicator 13010. For example, when the flexible display 13020 is extended and reduced, the luminosity or brightness of the image indicator 13010 may be changed.

Also, the animation effect may be applied to the image indicator 13010 in correspondence to the additional extension length 13030 of the flexible display. For example, when a user extends or reduces the flexible display 13020, the indicators 8010 and 9010 may move in a direction in which the flexible display 13020 is extended or reduced by the changed additional extension length 13030 of the flexible display. Alternatively, the length of the arrow may be reduced by the changed additional extension length 13030 of the flexible display. When the animation effect may be applied in correspondence to the additional extension length 13030 of the flexible display, it is possible for the user to intuitively know the additional extension length 13030 of the flexible display.

In this embodiment, the arrow is shown as an example of the image indicator 13010. However, the indicator may be displayed using various images. In addition, various animation effects may be applied to the image. An image and animation effects applied to the image may be variously set by the user and are not limited to the above embodiment.

Figure 14:
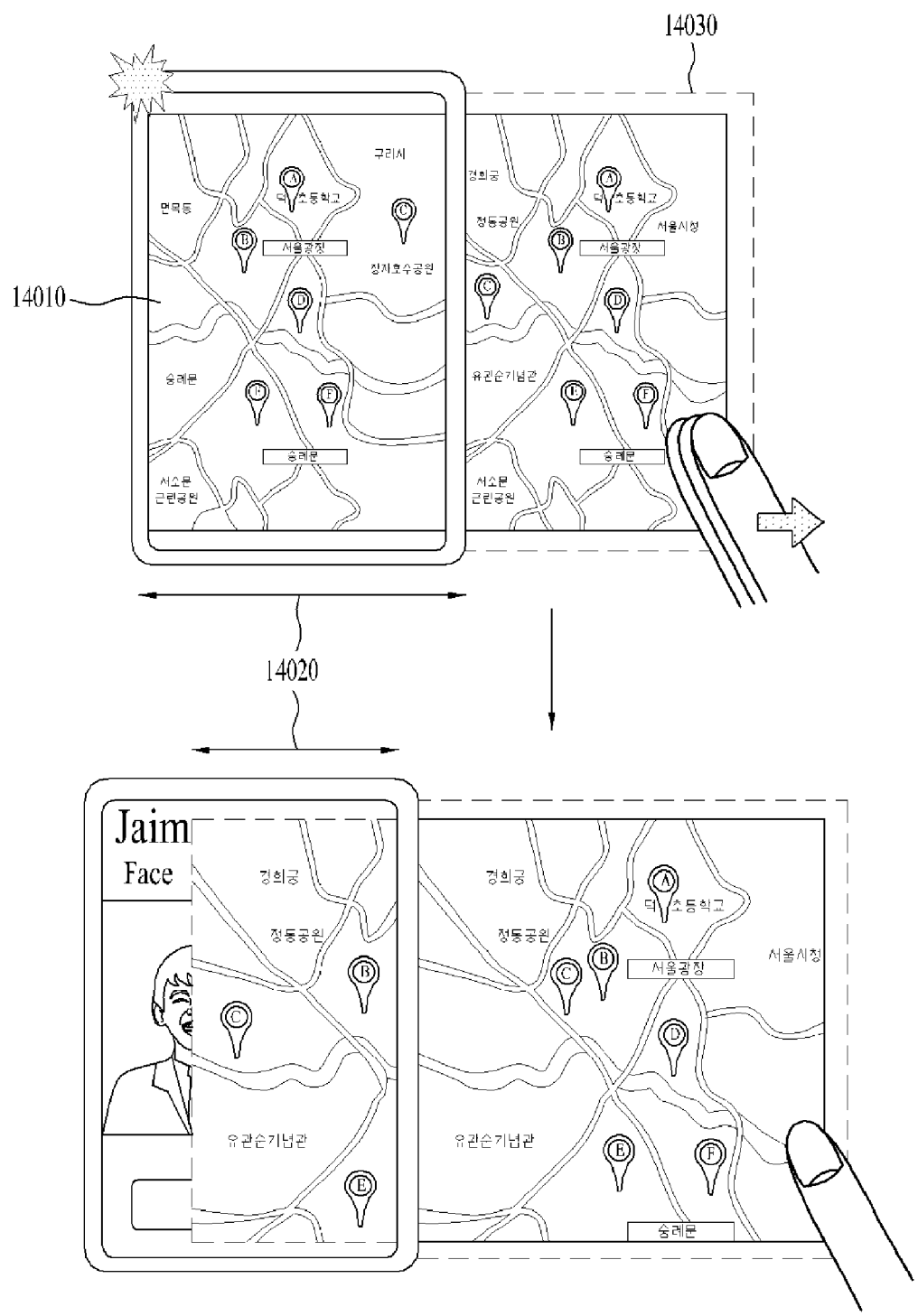
FIG. 14 is a view showing a portable device in which an application execution screen image is displayed as an indicator when a flexible display is extended according to an embodiment.

FIG. 14 is a view showing a portable device in which an application execution screen image 14010 is displayed as an indicator when a flexible display 14030 is extended according to an embodiment. Specifically, FIG. 14 is a view showing a portable device in which an indicator 14010 is an application execution screen image which is not displayed on a flexible display 14030.

The indicator 14010 may be an execution screen corresponding to the additional extension length 9050 of the application execution screen on the flexible display as shown in FIG. 9. Specifically, in a case in which the extension length of the flexible display 14030 is less than the total width of the application execution screen, the remaining application execution screen, which is not displayed, may be displayed on a main display as the indicator 14010. When the application execution screen corresponding to an additional extension length 14020 of the flexible display is displayed as the indicator, the portable device may provide a user with brief information regarding the construction and details of the application execution screen as well as the additional extension length of the application execution screen.

Also, since the execution screen indicator 14010 is an image indicator, the above animation effect may also be applied to the execution screen indicator 14010 in a manner identical or similar to FIG. 13. The animation effect may be applied to change the position, length, size, color, transparency, brightness or luminosity of the image indicator 14010.

Also, the animation effect may be applied to the image indicator 14010 in correspondence to the additional extension length 14020 of the flexible display. For example, when a user extends or reduces the flexible display 14030, the indicator 14010 may move in a direction in which the flexible display 14030 is extended or reduced by the changed additional extension length 14020 of the flexible display. Alternatively, the length of the indicator may be extended or reduced by the changed additional extension length 14020 of the flexible display. When the animation effect is applied in correspondence to the additional extension length 14020 of the flexible display, it is possible for the user to intuitively know the additional extension length 14020 of the flexible display.

In this embodiment, the image indicator 14010 is shown as an example. However, the indicator may be displayed using various images. In addition, various animation effects may be applied to the image. An image and animation effects applied to the image may be variously set by the user and are not limited to the above embodiment.

Figure 15:
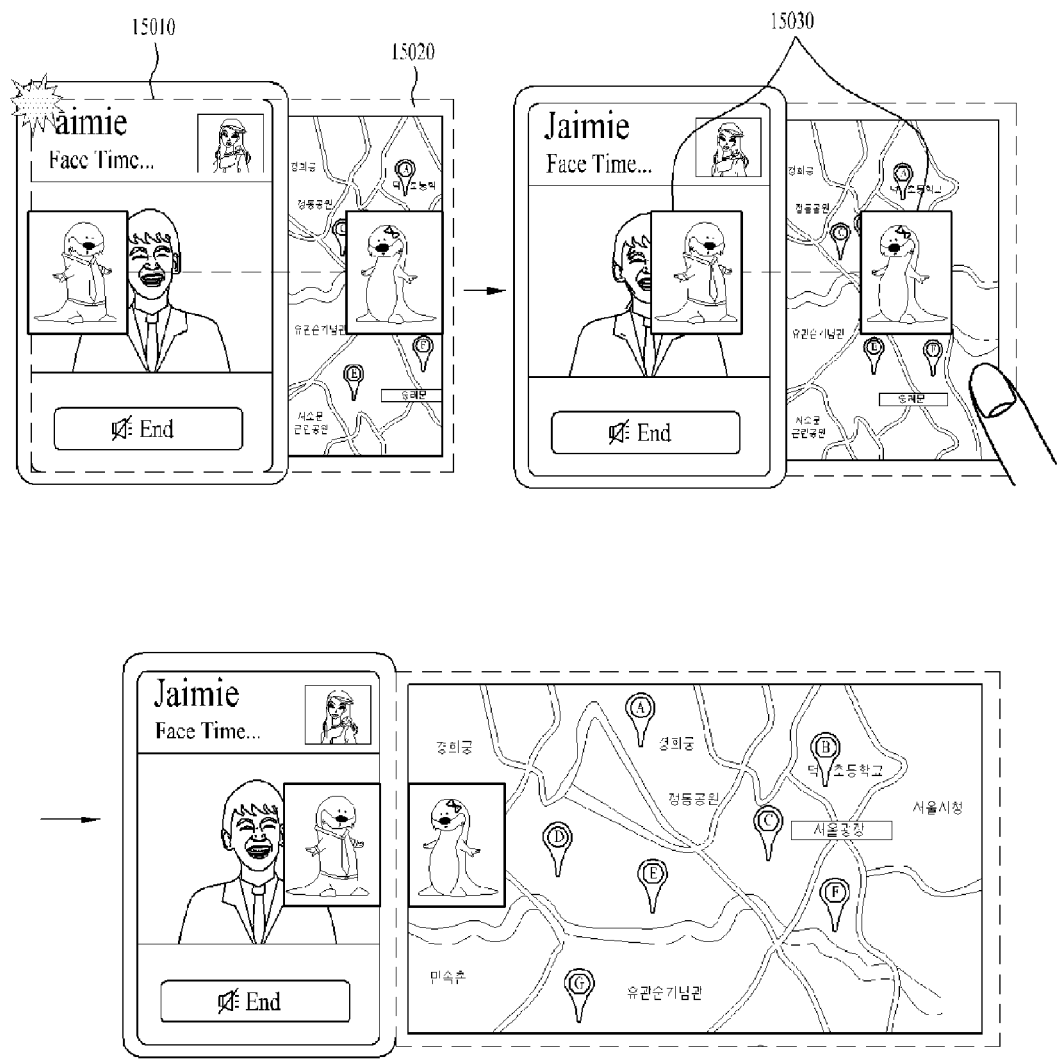
FIG. 15 is a view showing a portable device in which an indicator is displayed on a main display and a flexible display when the flexible display is extended according to an embodiment.

FIG. 15 is a view showing a portable device in which an indicator 15030 is displayed on a main display 15010 and a flexible display 15020 when the flexible display 15020 is extended according to an embodiment.

The indicator 15030 may be displayed on the main display 15010 and the flexible display 15020. Also, an animation effect may be applied to the indicator 15030 such that the indicator 15030 functions to indicate an additional extension length of the flexible display. Specifically, a first indicator may be displayed on the main display, and a second indicator may be displayed on the flexible display. Also, the distance between the first indicator and the second indicator may be changed or visual effects may be applied to the indicators according to the change of the additional extension length of the flexible display. In this way, relations between the two indicators may be adjusted.

For example, as shown in FIG. 15, a male character 15030 may be displayed on the left edge of the main display, and a female character 15030 may be displayed on the right edge of the flexible display. As the flexible display 15020 is extended or reduced, an animation effect may be applied such that the distance between the two characters displayed on the main display and the flexible display is increased or decreased. When the flexible display 15020 is extended by the additional extension length of the flexible display or an additional extension length of an application execution screen, the two characters 15030 may be coupled to each other to form a picture. The picture may disappear or remain displayed. The animation effect that the portable device applies to the image may enable a user to intuitively know the additional extension length of the flexible display.

In this embodiment, the image indicator is shown as an example. However, the indicator may be displayed using various images. In addition, various animation effects may be applied to the image. For example, character may move upward, downward, or diagonally. An image and animation effects applied to the image may be variously set by a user and are not limited to the above embodiment.

FIG. 16 is a view showing a portable device in which an indicator is output as a notice sound 16010 or a notice vibration 16020 according to an embodiment. Specifically, FIG. 16 is a view showing an embodiment of portable device in which, when a flexible display is extended or reduced, an indicator outputs sound 16010 or vibration 16020 corresponding to an additional extension length of the flexible display to inform a user of the additional extension length of the flexible display.

The portable device may output the notice sound 16010 or the notice vibration 16020 to function as an indicator. For example, when the additional extension length of the flexible display is equal to or less than the width of a main display, the portable device may output the notice sound 16010 or the notice vibration 16020. Alternatively, when the flexible display is fully extended, the portable device may output the notice sound 16010 or the notice vibration 16020. The notice sound 16010 or the notice vibration 16020 may be output in combination with the above image indicator and the virtual contour line indicator.

Also, the portable device may output the notice sound 16010 or the notice vibration 16020 in correspondence to the additional extension length of the flexible display. Specifically, the portable device may control the volume of the notice sound 16010 or the intensity of the notice vibration 16020 according to the change of the additional extension length of the flexible display such that the portable device functions as an indicator. For example, as the flexible display is extended, the intensity of the notice vibration 16020 may be gradually increased or decreased. Alternatively, as the flexible display is extended, the pitch of the notice sound 16010 may be increased or decreased. In addition, kind of the notice sound or kind of the notice vibration may be changed such that portable device functions as an indicator.

The volume, kind, and tone of the notice sound 16010 may be variously output and set by a user. The intensity and kind of the notice vibration 16020 may also be variously output and set by the user.

Figure 17:
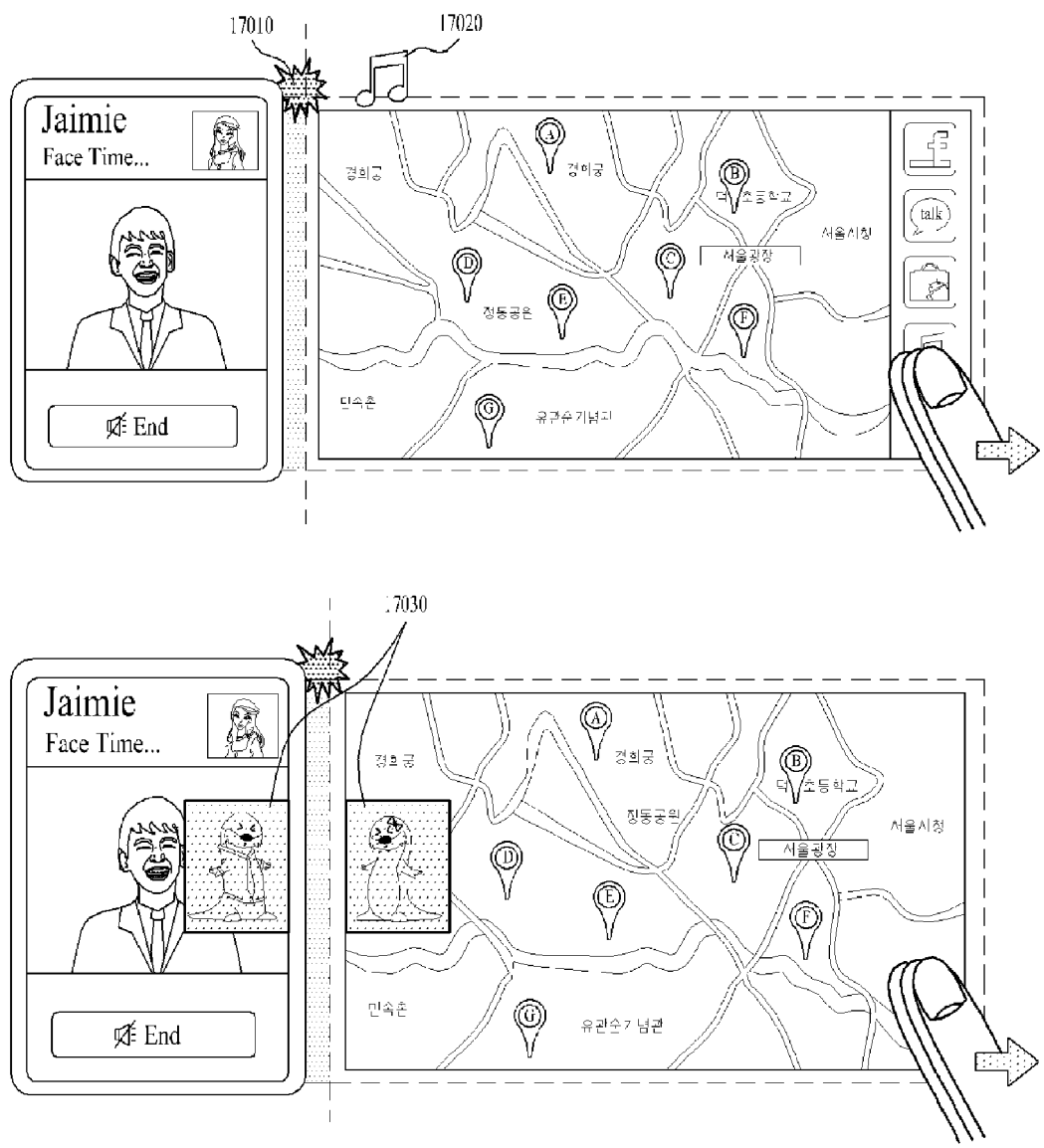
FIG. 17 is a view showing a portable device that outputs a warning notice or a warning image according to an embodiment.

FIG. 17 is a view showing a portable device that outputs a warning notice or a warning image according to an embodiment. Even when a flexible display is extended to an extension length limit, force may be applied to the flexible display to extend the flexible display to more than the extension length limit. At this time, the portable device may provide a warning notice to inform a user that the flexible display has been extended to more than the extension length limit, thereby preventing further extension of the flexible display. The warning notice may be output as one selected from among a warning sound 17020, a warning vibration 17010, and a warning image 17030.

In an embodiment, the volume, kind, and tone of the warning sound 17020 may be variously output and set by a user. In an embodiment, the intensity and kind of the warning vibration 17010 may also be variously output and set by the user. If a notice sound or a notice vibration is output as an indicator, the warning sound 17020 or the warning vibration 17010 may be output differently from the notice sound or the notice vibration. For example, as the flexible display is extended, a notice sound may be output. At this time, when the flexible display is extended to the extension length limit, the pitch or volume of the notice sound may be abruptly increased. When the flexible display is extended to more than the extension length limit, the notice sound may be abruptly changed to warn the user that the flexible display has been extended more than necessary. For the warning vibration 17010, a vibration, the kind of which is different from the vibration output as the indicator, may be output, and the intensity of the vibration may be changed to warn the user that the flexible display has been extended more than necessary.

In an embodiment, the warning image 17030 may be displayed in the form of a specific image when the flexible display is extended to more than the extension length limit. The size, shape, color, brightness or luminosity of the warning image 17030 may be variously set and variously set by the user in the same manner as the image indicator. Also, the warning image 17030 may be displayed in correspondence to the image indicator. For example, in a case in which the flexible display is fully extended, and therefore, the two characters 15030 are coupled to each other as shown in FIG. 15, a warning image, on which the two characters have different expressions, may be displayed when the flexible display is further extended. However, the warning image 17030 does not always correspond to the image indicator. That is, the warning image 17030 may be different from the image indicator. Also, when the flexible display is extended to the extension length limit, the portable device may apply an animation effect to the image indicator to warn the user that the flexible display has been extended more than necessary.

Figure 18:
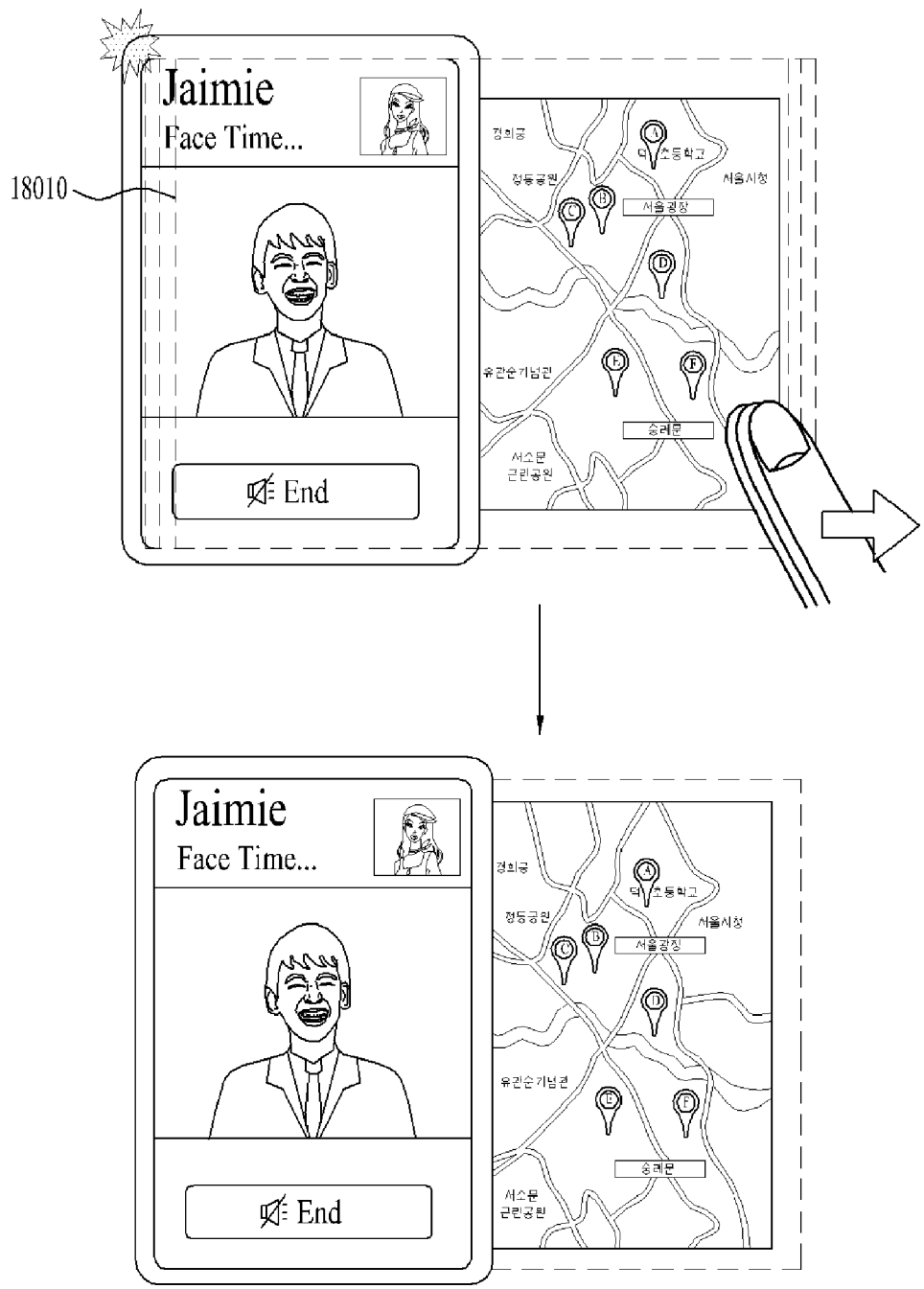
FIG. 18 is a view showing a portable device when the extension of a flexible display is stopped according to an embodiment.

FIG. 18 is a view showing a portable device when the extension of a flexible display is stopped according to an embodiment.

An indicator 18010 may not be displayed while the flexible display is not moved. This is because continuous display of the indicator 18010, as an image indicator, may hide a portion of an application execution screen displayed on a main display with the result that it may be difficult to secure user's view with respect to the application execution screen. In a case in which the indicator 18010 is a notice vibration indicator or a notice sound indicator, continuous output of the indicator 18010 may cause unnecessary power consumption and disturb a user in using the portable device.

However, display timing of the indicator 18010 and display time of the indicator 18010 may be variously set by the user. Consequently, the display timing of the indicator 18010 and the display time of the indicator 18010 are not limited to the above embodiments. For example, the indicator 18010 may be set such that the indicator 18010 does not disappear but is continuously displayed on the main display even when the extension of the flexible display is stopped. Alternatively, the notice vibration or the notice sound may be set such that the notice vibration or the notice sound is continuously output even when the extension of the flexible display is stopped.

Figure 19:
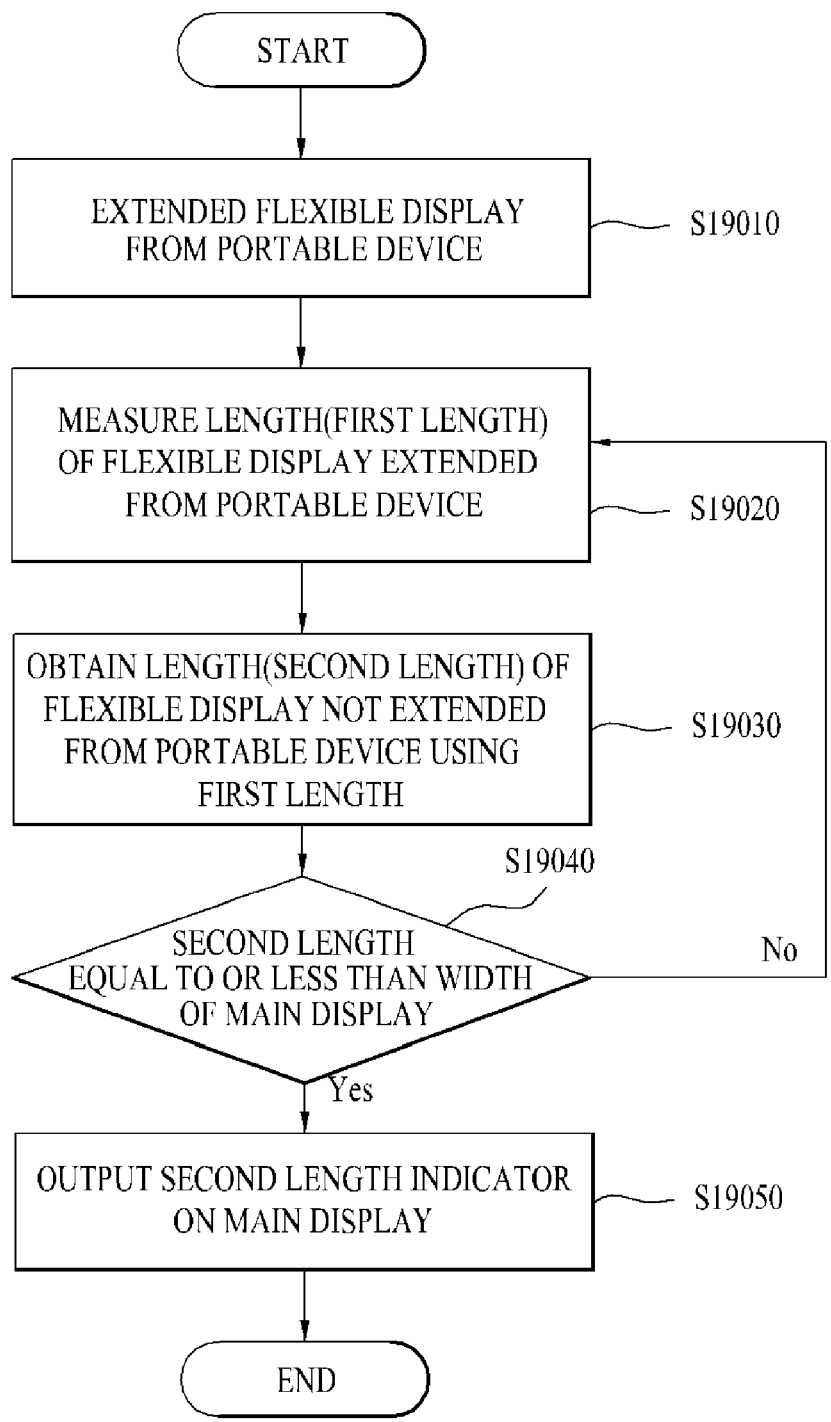
FIG. 19 is a view showing a control method of a portable device according to an embodiment.

FIG. 19 is a view showing a control method of a portable device according to an embodiment. Each step of FIG. 19 may be controlled by the control unit 4080 and the processor 4060 of FIG. 4. Also, a detailed description will not be given of components of the embodiment shown in FIG. 19 identical to or corresponding to those of FIGS. 6 to 9.

First, a flexible display may be extended from the portable device (S19010). The flexible display may be contained in a housing unit provided inside or outside the portable device in a folded or rolled up fashion. The flexible display may be unfolded or rolled out based on the structure of the portable device or the housing unit.

Subsequently, a measurement unit may measure the length of the flexible display extended from the portable device (S19020). The measured length is referred to as a first length.

Subsequently, an additional extension length of the flexible display which has not been extended from the portable device, may be obtained using the first length (S19030). The additional extension length is referred to as a second length. The second length includes the additional extension length of the flexible display and an additional extension length of the flexible display to display the entirety of an application execution screen. The portable device obtains the second length using the first length and information regarding the total width of the flexible display and the total width of the application execution screen stored in a storage unit. For example, the extended length of the flexible display may be subtracted from the total width of the flexible display to obtain the second length.

Subsequently, the portable device compares the second length obtained at the previous step with the width of a main display (S 19040). If the second length is equal to or less than the width of the main display, the portable device may output an indicator configured to indicate the second length (S 19050). On the other hand, if the second length is greater than the width of the main display, the control unit may not output the indicator configured to indicate the second length, and the procedure may return to the first length measurement step (S19020).

As is apparent from the above description, in an embodiment, the portable device may inform the user of the additional extension length of the flexible display through the indicator, thereby preventing the portable device from being dropped or the flexible display from being torn due to impact caused by the extension of the flexible display exceeding the extension length limit.

Also, in an embodiment, the portable device may inform the user of the length of the flexible display to be extended to display the entirety of the application execution screen through the indicator, thereby preventing the flexible display from being extended more than necessary.

Also, in an embodiment, the indicator may provide various user interfaces, such as a specific image, a notice sound, or a notice vibration, thereby stimulating user interest.

The drawings were individually described for the convenience of description; however, the embodiments described in the respective drawings may be combined to realize a new embodiment. Also, designing recording media that can be read in a computer, in which programs to perform the previous embodiments are installed, according to needs of those skilled in the art falls within a right scope.

Also, the portable device and the control method thereof may not be limitedly applied to the construction and method of the embodiments as previously described; however, all or some of the embodiments may be selectively combined to achieve various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Also, the width and length mentioned used in this specification may include a substantial width and length within a predetermined range as well as an exact width and length.

Also, both an article invention and a method invention are described in this specification, and a description of the article invention and a description of the method invention may be supplementarily applied as necessary.

What is claimed is:

1. A portable device comprising:
   a main display;
   a flexible display;
   a housing unit configured to contain at least a portion of the flexible display;
   a measurement unit configured to measure a first length of the flexible display, the first length being a measurement of the flexible display that is extended from the housing unit; and
   a control unit configured to:
   obtain a second length of the flexible display, the second length being a measurement of the flexible display that is not extended from the housing unit using the first length when the flexible display is extended from the housing unit,
   compare the second length with a width of the main display to obtain a comparison result, and
   display an indicator configured to indicate the second length on the main display according to the comparison result,
   wherein the indicator is displayed to move according to a change of the second length in a direction in which the flexible display is extended or reduced when the second length is equal to or less than the width of the main display.

2. The portable device according to claim 1, wherein the second length is obtained by subtracting the first length from a total width of the flexible display.

3. The portable device according to claim 2, wherein the indicator is displayed as a virtual contour line of the flexible display in correspondence to the second length while the flexible display is extended from the housing unit when the second length is equal to or less than the width of the main display.

4. The portable device according to claim 1, wherein, when at least one application execution screen is displayed on the flexible display, the second length is obtained by subtracting the first length from a total width of the application execution screen.

5. The portable device according to claim 4, wherein the indicator is displayed as a virtual contour line of the application execution screen in correspondence to the second length while the flexible display is extended from the housing unit when the second length is equal to or less than the width of the main display.

6. The portable device according to claim 4, wherein the flexible display comprises a touch sensor configured to sense a touch input.

7. The portable device according to claim 6, wherein
   when the touch sensor senses the touch input on the flexible display, and the application execution screen displayed on the flexible display is changed to another application execution screen according to the touch sensing result,
   the control unit displays the indicator configured to indicate the second length of the changed application execution screen on the main display.

8. The portable device according to claim 1, wherein the indicator is displayed as an image while the flexible display is extended from the housing unit.

9. The portable device according to claim 8, wherein the control unit applies an animation effect to the image in correspondence to the second length.

10. The portable device according to claim 8, wherein the image is related to an execution screen image of an application execution screen which is displayed on the flexible display.

11. The portable device according to claim 1, wherein the control unit outputs a notice vibration or a notice sound while the flexible display is extended from the housing unit to inform a user of the second length.

12. The portable device according to claim 11, wherein the control unit adjusts intensity of the notice vibration or volume of the notice sound in correspondence to the second length.

13. The portable device according to claim 11, wherein the notice vibration or the notice sound is not output while extension of the flexible display is stopped.

14. The portable device according to claim 1, wherein the indicator is not displayed while extension of the flexible display is stopped.

15. The portable device according to claim 1, wherein the control unit outputs a warning notice when the first length is equal to or greater than a total width of the flexible display.

16. A portable device comprising:
   a main display;
   a flexible display;
   a housing unit configured to contain at least a portion of the flexible display;
   a measurement unit configured to measure a length of the flexible display not extended from the housing unit when the flexible display is extended from the housing unit; and
   a control unit configured to display an indicator configured to indicate the measured length on the main display when the measured length is equal to or less than a width of the main display, wherein the indicator is displayed to move according to a change of the second length in a direction in which the flexible display is extended or reduced.

17. A portable device comprising:
a main display;
a flexible display;
a housing unit configured to contain at least a portion of the flexible display;
a measurement unit configured to sense that the flexible display has been extended from the housing unit to a predetermined length or more; and
a control unit configured to display an indicator configured to indicate an additional extension length of the flexible display on the main display upon sensing that the flexible display has been extended to the predetermined length or more,
wherein the indicator is displayed to move according to a change of an additional extension length in a direction in which the flexible display is extended or reduced when the flexible display has been extended to the predetermined length or more.

18. A control method of a portable device comprising a main display, a flexible display, and a housing unit containing at least a portion of the flexible display, the control method comprising:
extending the flexible display from the housing unit;
measuring a first length of the flexible display, the first length being a length of the flexible display that is extended from the housing unit;
acquiring a second length of the flexible display, the second length being a length of the flexible display that is not extended from the housing unit, using the first length;
comparing the second length with a width of the main display to obtain a comparison result; and
displaying an indicator configured to indicate the second length on the main display according to the comparison result,
wherein the indicator is displayed to move according to a change of the second length in a direction in which the flexible display is extended or reduced when the second length is equal to or less than the width of the main display.

19. A control method of a portable device comprising a main display, a flexible display, and a housing unit containing at least a portion of the flexible display, the control method comprising:
extending the flexible display from the housing unit;
measuring a length of the flexible display not extended from the housing unit;
comparing the measured length with a width of the main display; and
displaying an indicator configured to indicate the measured length on the main display when the measured length is equal to or less than the width of the main display,
wherein the indicator is displayed to move according to a change of the measured length in a direction in which the flexible display is extended reduced.

* * * * *